United States Patent
Okuno

(10) Patent No.: US 9,496,534 B2
(45) Date of Patent: Nov. 15, 2016

(54) SEPARATOR, BATTERY, BATTERY PACK, ELECTRONIC APPARATUS, ELECTRIC VEHICLE, ELECTRIC STORAGE DEVICE, AND POWER SYSTEM

(71) Applicant: Sony Corporation, Tokyo (JP)

(72) Inventor: Moriaki Okuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/378,586

(22) PCT Filed: Feb. 14, 2013

(86) PCT No.: PCT/JP2013/054245
§ 371 (c)(1),
(2) Date: Aug. 13, 2014

(87) PCT Pub. No.: WO2013/133025
PCT Pub. Date: Sep. 12, 2013

(65) Prior Publication Data
US 2015/0171396 A1   Jun. 18, 2015

(30) Foreign Application Priority Data
Mar. 6, 2012 (JP) ................. 2012-049249

(51) Int. Cl.
*H01M 2/16* (2006.01)
*H01M 2/18* (2006.01)
(Continued)

(52) U.S. Cl.
CPC .......... *H01M 2/1653* (2013.01); *B60L 11/184* (2013.01); *B60L 11/1816* (2013.01);
(Continued)

(58) Field of Classification Search
CPC B01D 29/00; B01D 53/228; B01D 67/0048; B01D 61/14; B01D 61/00; C04B 35/106; B05D 5/10; B29C 44/04; H01M 2/16; H01M 2/166; H01M 4/04; H01M 4/66; H01M 4/0404; H01M 4/0409; H01M 10/40; H01M 4/0402; H01M 4/62; H01M 4/60; H01G 9/02; G02C 7/06; B29D 11/00; B29D 11/0028
See application file for complete search history.

(56) References Cited

U.S. PATENT DOCUMENTS 5,981,107 A * 11/1999 Hamano ................. H01M 4/04
429/129
7,959,011 B2 * 6/2011 Hennige .............. B01D 53/228
210/490

(Continued)

FOREIGN PATENT DOCUMENTS

JP    2005-196999    7/2005
JP    2007-508669    4/2007

(Continued)

OTHER PUBLICATIONS

International Search Report issued in connection with International Patent Application No. PCT/JP2013/054245, dated Apr. 9, 2013. (2 pages).

(Continued)

*Primary Examiner* — Behrang Badii
(74) *Attorney, Agent, or Firm* — K&L Gates LLP

(57) ABSTRACT

A separator includes a substrate layer and a porous surface layer that is provided on at least one major surface of the substrate layer and contains a first particle, a second particle, and a resin material. The surface layer includes a first region configured by the first particle and a second region configured by the second particle and the resin material.

20 Claims, 18 Drawing Sheets

(51) Int. Cl.
  *B60L 11/18*      (2006.01)
  *H01M 4/38*       (2006.01)
  *H01M 10/0525*    (2010.01)
  *H02J 7/00*       (2006.01)
  *H01M 10/052*     (2010.01)

(52) U.S. Cl.
  CPC ........ *B60L11/1842* (2013.01); *B60L 11/1844* (2013.01); *B60L 11/1848* (2013.01); *B60L 11/1851* (2013.01); *B60L 11/1859* (2013.01); *B60L 11/1874* (2013.01); *B60L 11/1879* (2013.01); *H01M 2/1686* (2013.01); *H01M 2/18* (2013.01); *H01M 4/38* (2013.01); *H01M 10/0525* (2013.01); *H02J 7/00* (2013.01); *B60L 2200/12* (2013.01); *B60L 2200/22* (2013.01); *B60L 2200/26* (2013.01); *B60L 2230/16* (2013.01); *B60L 2230/22* (2013.01); *B60L 2230/28* (2013.01); *B60L 2230/30* (2013.01); *B60L 2230/40* (2013.01); *B60L 2240/545* (2013.01); *H01M 10/052* (2013.01); *H01M 2220/20* (2013.01); *Y02E 60/721* (2013.01); *Y02T 10/7005* (2013.01); *Y02T 10/705* (2013.01); *Y02T 10/7011* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | | |
|---|---|---|---|
| 8,822,082 B2* | 9/2014 | Katayama | H01G 9/02 429/247 |
| 2002/0025475 A1* | 2/2002 | Matsumoto | H01M 4/0404 429/235 |
| 2007/0264577 A1 | 11/2007 | Katayama et al. | |
| 2008/0245735 A1* | 10/2008 | Hennige | B01D 53/228 210/650 |
| 2010/0015530 A1* | 1/2010 | Katayama | H01G 9/02 429/246 |
| 2012/0176097 A1 | 7/2012 | Takezawa et al. | |
| 2012/0202102 A1 | 8/2012 | Kakibe et al. | |

FOREIGN PATENT DOCUMENTS

| | | |
|---|---|---|
| JP | 2011-168048 | 9/2011 |
| JP | 2011-238427 | 11/2011 |
| JP | 2012-109123 | 6/2012 |
| WO | 2006/062153 | 6/2006 |
| WO | 2008/053898 | 5/2008 |
| WO | 2008/114727 | 9/2008 |
| WO | 2011/033781 | 3/2011 |

OTHER PUBLICATIONS

Japanese Office Action issued Nov. 24, 2015 in corresponding Application No. 2014-503752.

* cited by examiner

A

B

C

A

B

A

B

C

A

B

A

B

SEPARATOR, BATTERY, BATTERY PACK, ELECTRONIC APPARATUS, ELECTRIC VEHICLE, ELECTRIC STORAGE DEVICE, AND POWER SYSTEM

CROSS REFERENCES TO RELATED APPLICATIONS

The present application is a national stage of International Application No. PCT/JP2013/054245 filed on Feb. 14, 2013 and claims priority to Japanese Patent Application No. 2012-049249 filed on Mar. 6, 2012, the disclosure of which is incorporated herein by reference.

BACKGROUND

The present technique relates to a separator, a battery, a battery pack, electronic apparatus, an electric vehicle, an electric storage device, and a power system. More specifically, the present technique relates to a separator and a battery using the separator, and a battery pack using this battery, electronic apparatus, an electric vehicle, an electric storage device, and a power system.

In recent years, along with increase in the capacity of the lithium ion secondary battery, using a material alloyed with lithium as the anode active material is being studied. For example, as such an anode active material, an alloy-based anode material containing an element that can form an alloy with lithium, such as silicon or tin, whose theoretical capacity is higher than that of the carbon material, is being studied.

However, because the volume in the cell is limited, if the alloy-based anode material is used, expansion of the active material cannot be absorbed and pressure is applied to the respective members configuring the battery, so that a problem that damage of the member, deformation, the rise of the cell internal pressure, the lowering of the battery characteristics, and so forth are caused occurs.

Against this problem, a technique of forming a concave and convex shape in the separator to absorb the expansion of the alloy-based anode material has been reported. For example, in Patent Literature 1, a technique of forming a concave-convex shape in a polyolefin microporous membrane by embossing to absorb the expansion of the anode has been proposed.

Furthermore, in order to realize increase in the capacity of the lithium ion secondary battery, increase in the potential of the cathode is being studied. Along with the increase in the potential of the cathode, oxidation resistance and heat resistance are needed for the separator. Against this, a technique of providing a surface layer using heat-resistant particles on the separator and the electrode to enhance the heat resistance and oxidation resistance of the battery has been proposed.

CITATION LIST

Patent Literature

[PTL 1]
PCT Patent Publication No. WO08/053898

SUMMARY

Technical Problem

For the separator, not only absorption of expansion of the anode but the function to enhance the safety of the battery, such as the oxidation resistance and the heat resistance, is required. With the polyolefin microporous membrane, which is weak in the oxidation resistance and the heat resistance, like that proposed in Patent Literature 1, the oxidation resistance and the heat resistance are not sufficient.

Therefore, an object of the present technique is to provide a separator that can absorb expansion of the anode to suppress the deterioration of the electrode and can enhance the oxidation resistance and the heat resistance, a battery, and a battery pack using it, electronic apparatus, an electric vehicle, an electric storage device, and a power system.

Solution to Problem

To solve the above-described problems, a first technique is a separator including a porous substrate layer and a porous surface layer that is provided on at least one major surface of the substrate layer and contains a first particle, a second particle, and a resin material. The surface layer includes a first region configured by at least the first particle and a second region configured by the second particle and the resin material.

A second technique is a battery including a cathode, an anode, an electrolyte, and a separator. The separator includes a porous substrate layer and a porous surface layer that is provided on at least one major surface of the substrate layer and contains a first particle, a second particle, and a resin material. The surface layer includes a first region configured by at least the first particle and a second region configured by the second particle and the resin material.

Battery pack, electronic apparatus, electric vehicle, electric storage device, and power system of the present technique are characterized by including a battery having the separator of the first technique or the battery of the second technique.

In the present technique, the surface layer provided on at least one major surface of the substrate layer includes the first region containing at least the first particle and the second region containing the second particle and the resin material. Due to the inclusion of the first region containing at least the first particle and the second region containing the second particle and the resin material by the surface layer, expansion of the anode can be absorbed and the deterioration of the electrode can be suppressed. In addition, the oxidation resistance and the heat resistance can be enhanced.

Advantageous Effects of Invention

According to the present technique, the expanded volume of the anode can be absorbed and the deterioration of the electrode can be suppressed. In addition, the oxidation resistance and the heat resistance can be enhanced.

Additional features and advantages are described herein, and will be apparent from the following Detailed Description and the figures.

DETAILED DESCRIPTION

Embodiments of the present technique will be described below with reference to the drawings. The description will be made in the following order.
1. First Embodiment (example of separator)
2. Second Embodiment (first example of battery)
3. Third Embodiment (second example of battery)
4. Fourth Embodiment (third example of battery)
5. Fifth Embodiment (example of battery pack using battery)
6. Sixth Embodiment (example of electric storage system and so forth using battery)
7. Other Embodiments (modification examples)

1. First Embodiment

Structure of Separator

Figure 1:
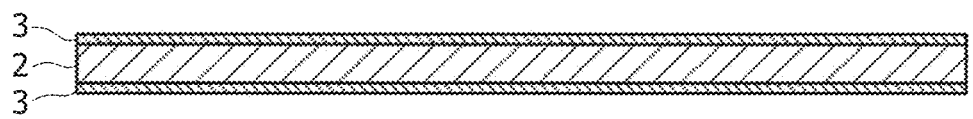
FIG. 1 is a sectional view showing a configuration example of a separator according to a first embodiment of the present technique.

With reference to FIG. 1, a configuration example of a separator according to a first embodiment of the present technique will be described. FIG. 1 is a sectional view showing a configuration example of the separator according to the first embodiment of the present technique. As shown in FIG. 1, the separator according to the first embodiment of the present technique includes a substrate 2 and a surface layer 3 formed on at least one major surface of two major surfaces of the substrate 2. Although the example of the separator shown in FIG. 1 is an example of the separator in which the surface layer 3 is formed on both of the two major surfaces of the substrate 2, the separator may be one in which the surface layer 3 is formed on one major surface of the two major surfaces of the substrate 2. The separator is to isolate the cathode and the anode in the battery and prevent short-circuiting of a current due to contact of both electrodes.

(Substrate)

The substrate 2 is a porous layer having porosity. More specifically, the substrate 2 is e.g. a porous membrane made from an insulating membrane having high ion permeability and predetermined mechanical strength. For example, if the separator is used for a battery, an electrolyte solution is retained in pores of the substrate 2. It is preferable for the substrate 2 to need characteristics that it has high resistance against the electrolyte solution and low reactivity and is hard to expand while having predetermined mechanical strength as the major part of the separator.

It is preferable to use, as the resin material configuring the substrate 2, e.g. a polyolefin resin such as polypropylene or polyethylene, an acrylic resin, a styrene resin, a polyester resin, a nylon resin, or the like. In particular, polyethylene such as low-density polyethylene, high-density polyethylene, and linear polyethylene, or a low-molecular-weight wax component of them, or a polyolefin resin such as polypropylene is favorably used because having an appropriate melting temperature and being accessible. Furthermore, a structure obtained by stacking porous membranes of two or more kinds of them or a porous membrane formed by melting and kneading two or more kinds of resin materials may be employed. A component including a porous membrane composed of a polyolefin resin is excellent in separation between the cathode and the anode and can further reduce the lowering of internal short-circuiting.

As the substrate 2, a non-woven fabric may be used. As the fiber configuring the non-woven fabric, an aramid fiber, a glass fiber, a polyolefin fiber, a polyethylene terephthalate (PET) fiber, a nylon fiber, or the like can be used. Furthermore, a non-woven fabric may be made by mixing two or more kinds of fibers of them.

The thickness of the substrate 2 can be arbitrarily set as long as it is at least a thickness with which the necessary strength can be kept. It is preferable for the substrate 2 to be set to such a thickness that the substrate 2 provides insulation between the cathode and the anode to prevent short-circuiting and so forth and has ion permeability for favorably making a battery reaction via the separator and the volume efficiency of the active material layer contributing to the battery reaction in the battery can be set as high as possible. Specifically, it is preferable that the thickness of the substrate 2 is e.g. at least 5 μm and at most 20 μm.

(Surface Layer)

The surface layer 3 has porosity. Specifically, for example, a large number of minute voids are formed in the whole of the surface layer 3 in order for the surface layer 3 to have an ion permeation function, an electrolyte solution retention function, and so forth as the separator. If this separator is applied to a battery, an electrolyte solution is retained in pores (voids) of the surface layer 3.

Figure 2:
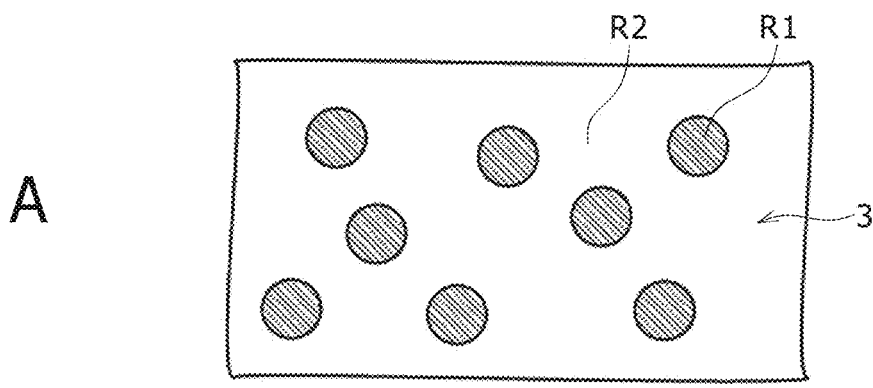
FIG. 2A is an enlarged top view magnifying part of a surface layer viewed from the top surface.
FIG. 2B is an enlarged sectional view schematically showing a section of the surface layer.
FIG. 2C is an enlarged view magnifying part of a first particle.
Figure 2:
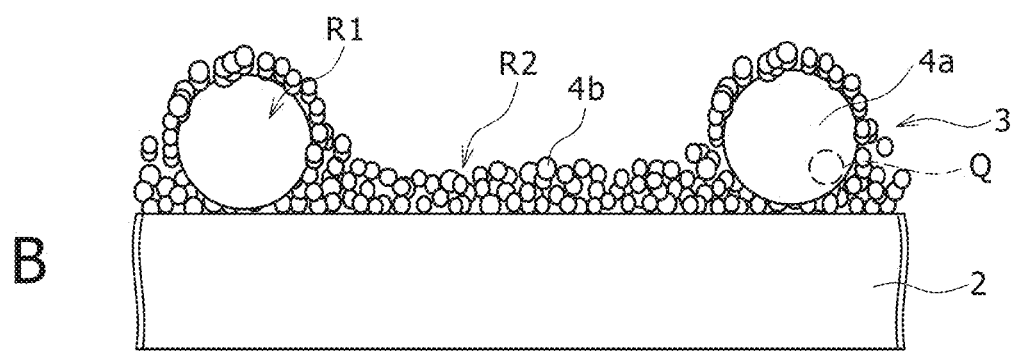
Figure 2:
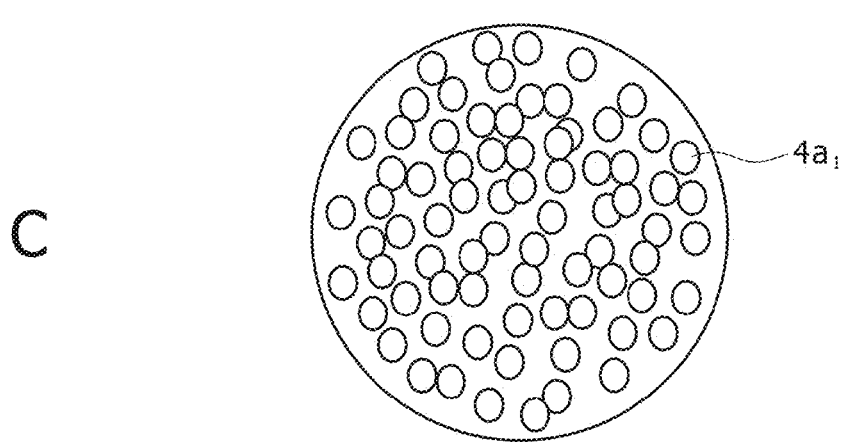

FIG. 2A is an enlarged top view magnifying part of the surface layer viewed from the top surface. FIG. 2B is an enlarged sectional view schematically showing a section of the surface layer before collapse of first particles. FIG. 2C is an enlarged sectional view magnifying part of the first particle (region Q). FIG. 3A is an enlarged sectional view schematically showing a section of the surface layer after the collapse of the first particles. FIG. 3B is an enlarged sectional view magnifying part of the first particle (region Q').

As shown in FIGS. 2A, 2B, and 3A, the surface layer 3 includes first particles 4a, second particles 4b, and a resin material (diagrammatic representation is omitted). In the surface layer 3, first regions R1 configured by the first particles 4a and a second region R2 configured by the second particles 4b and the resin material are formed. For example, the first regions R1 are dotted about the second region R2. In the surface layer 3, for example, a sea-island structure in which the island-like first regions R1 are dotted about the sea-like second region R2 is formed.

(First Region)

The first region R1 is configured by at least the first particle 4a. The first particle 4a is e.g. a secondary particle obtained by aggregation of microparticles $4a_1$ as primary particles. The first particle 4a is e.g. a collapsible particle that easily collapses by slight stress. For example, the first particle 4a does not collapse or collapses only partially at the time of fabrication of slurry obtained by dispersing particles in a solvent and at the time of fabrication of a battery, and collapses by receiving pressure attributed to expansion of the electrode in the battery. For example, the collapsible particle maintains its shape up to predetermined pressure but does not maintain its shape over the predetermined pressure. For example, it is preferable that the first particle 4a maintains its shape when the pressure received by the separator is at most 1.8 kg/cm$^2$ and the first particle 4a does not maintain its shape when the pressure received by the separator is 100 kg/cm$^2$. At least part of the surface of the first particle 4a may be covered by the second particles 4b.

As shown in FIG. 2B, before the collapse of the first particles 4a, the surface layer 3 has concavity and convexity formed by using the first particles 4a and the second particles 4b having different particle sizes. Before the collapse of the first particles 4a, the first regions R1 serve as convex parts of the concave-convex shape and the second region R2 serves as the bottom of the concave part adjacent to the convex parts of the concave-convex shape. For example, in the surface layer 3, the first particle 4a larger than the second particle 4b forms the convex part of the concave-convex shape. The first particle 4a functions as e.g. a spacer forming a space between the electrode and the separator. That the first particle 4a functions as a spacer means that the particle height of the first particle 4a is reflected in thickness measurement (film thickness measurement) of the surface layer 3. That is, it means that the particle height of the first particle 4a is almost equal to the thickness of the surface layer 3. That the particle height of the first particle 4a is almost equal to the thickness of the surface layer 3 means the case in which the difference between the particle height of the first particle 4a and the thickness of the surface layer 3 is at most 1 μm. In such a case, for example, it can be said that the first particle 4a functions as a spacer forming a space between the electrode and the separator also at the time of application of winder tension (winding tension), which is applied at the time of electrode winding. The particle height of the first particle 4a refers to the difference between the lowest position and the highest position of the first particle 4a forming the convex part in the thickness direction of the surface layer 3. For example, when a section of the separator is observed by a SEM, the particle height of the first particle 4a can be obtained by drawing a line that passes through the lowest position of the particle image of the first particle 4a in the thickness direction of the surface layer 3 and is perpendicular to the thickness direction and a line that passes through the highest position and is perpendicular to the thickness direction and measuring the length between these two parallel lines along the thickness direction.

As shown in FIG. 3A, if the anode expands at the time of a charge, the first particle 4a receives the expansion pressure of the anode to collapse and be crushed. For example, the first particle 4a collapses and is crushed in the thickness direction. Due to this, the expanded volume of the anode is absorbed, which can suppress damage of battery members such as the anode current collector. For example, in view of capability of more absorption of the expanded volume of the anode, it is preferable that the first particle 4a collapses and is crushed in the surface layer when the separator is pressed at 100 kg/cm$^2$ and thereby the compression rate of the surface layer after the press becomes at least 40%. The compression rate of the surface layer 3 can be obtained as follows for example. Specifically, the thickness of the crushed surface layer is calculated from the difference in the film thickness of the surface layer 3 between before press and after press. Next, by substituting "thickness of crushed surface layer" and "film thickness of surface layer before press" into the following equation, the compression rate of the surface layer is obtained.

Surface layer compression rate (%)=(Thickness of crushed surface layer/Film thickness of surface layer before press)*100(%)

Figure 3:
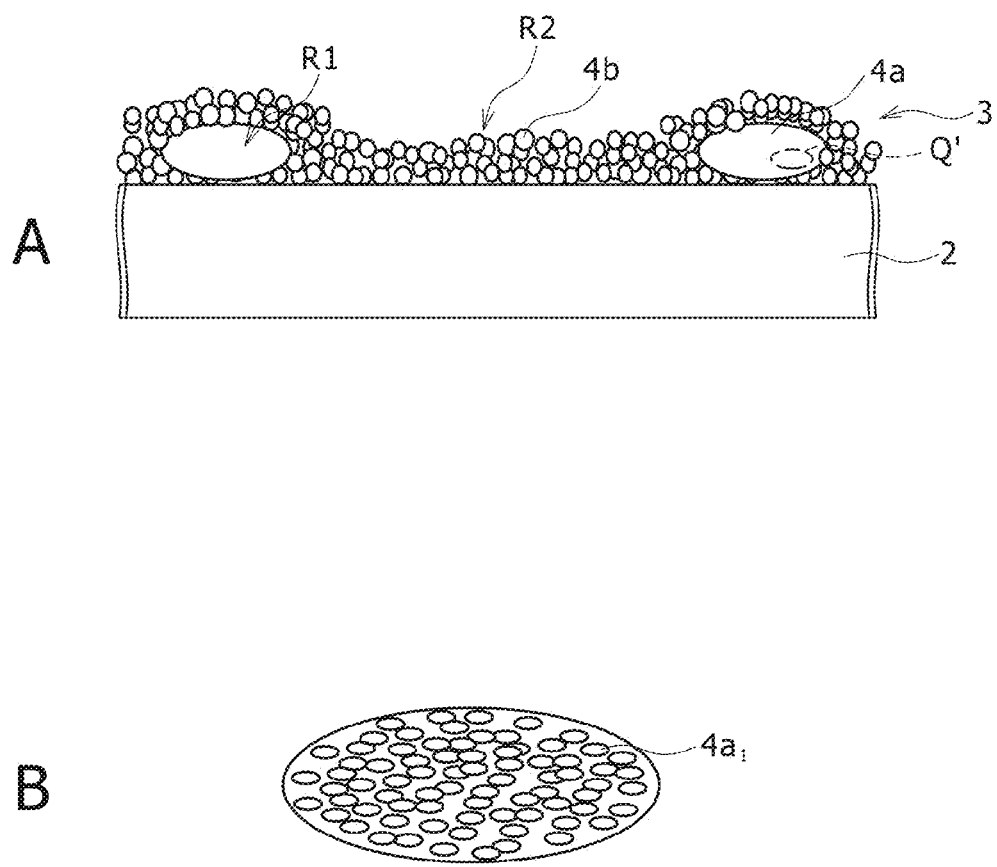
FIG. 3A is an enlarged sectional view schematically showing a section of the surface layer after collapse of the first particle.
FIG. 3B is an enlarged sectional view magnifying part of the first particle.

As shown in FIG. 3, after the collapse of the first particle 4a, the first regions R1 configured by the first particles 4a arising from aggregation of the microparticles $4a_1$ and the second region R2 configured by the second particles 4b and the resin material are maintained. After the collapse of the first particles 4a, the shape of the first particles 4a becomes a shape resulting from crushing of the shape before the collapse in the thickness direction. For example, after the collapse of the first particles 4a, the first particles 4a become particles with an ellipsoidal shape resulting from crushing of spherical particles before the collapse in the thickness direction. The ellipsoidal shape refers to a flattened shape having long axis and short axis. After the first particles 4a collapse and are crushed, the convex parts are substantially planarized due to the crushing of the first particles 4a and thereby the concavity and convexity of the surface layer 3 are alleviated. This can make the distance between the electrodes constant and thus suppress adverse effects such as the occurrence of potential unevenness.

The shape of the first particle 4a before the collapse is not particularly limited and e.g. a spherical shape, a granular shape, an indefinite shape, etc. are cited. The spherical shape includes not only the truly-spherical shape but also a shape resulting from a certain degree of flattening or distortion of a truly-spherical shape, a shape obtained by forming concavity and convexity in the surface of a truly-spherical shape, a shape obtained by combining these shapes, or the like. It is preferable that the shape of the first particle 4a before the collapse is a spherical shape in that the following advantages are achieved. Specifically, if the first particle 4a has a spherical shape, in a step of slurrying in which particles are dispersed in a solvent or the like, the time necessary for the slurrying is constant. This effect is noticeable particularly when the particle sizes are set identical. Furthermore, if the first particle 4a has a spherical shape, collapse of part of the particles due to friction, minute pressure, etc. occurs less often and the particles are easier to handle compared with particles having an indefinite shape. Moreover, the particle size of the particles having collapsibility is the film thickness of the surface layer before press and therefore size management is easier when the particles have a spherical shape.

The average particle size of the first particle 4a as the secondary particle is e.g. at least 1 μm and at most 50 μm, preferably at least 3 μm and at most 20 μm, and more preferably at least 3 μm and at most 10 μm. If the average particle size is smaller than 3 μm, the crushing amount of the surface layer 3 tends to decrease and the expanded volume of the anode that can be absorbed tends to decrease. An average particle size surpassing 20 μm tends to decrease the volume capacity of the battery. As the microparticles configuring the first particle 4a as the secondary particle, particularly particles referred to as so-called ultrafine particles are preferable.

The average particle size of the microparticles $4a_1$ configuring the first particle 4a is e.g. at least 1 nm and at most 500 nm, and it is preferable that it is at least 1 nm and at most 100 nm in that a larger crushing amount of the surface layer 3 is obtained. It is preferable that the compressive strength of the first particle 4a is at most 100 MPa. As such a first particle 4a, a secondary particle whose pore volume in the secondary particle surpasses 1 ml/g and whose specific surface area surpasses 500 m$^2$/g is preferable. The average particle size refers to the average particle diameter (D50) at 50% of the volume cumulative total starting from the side of particles having the smaller particle size in the particle size distribution measured by a laser diffraction method. For example, the average particle diameter (D50) can be measured by using a laser diffraction particle size distribution analyzer (made by Shimadzu Corporation, product name: SALD7100).

Specifically, examples of the first particle 4a include a granulated matter obtained by granulating fine particles under the existence of a bonding agent, a granulated matter obtained by spray drying of slurry in which fine particles are dispersed, a particle that becomes a secondary particle at the time of particle synthesis, or a molded and crushed matter obtained by crushing a molded matter arising from molding under a loose bonding condition, a particle having a hollow structure, or the like. Among them, a granulated matter is preferable as the first particle 4a. Furthermore, it is preferable that the first particle 4a is a metal oxide particle in terms of giving heat resistance and oxidation resistance to the separator.

(Second Region)

The second region R2 is composed of the second particles 4b and the resin material. The second region R2 has a porous structure. The resin material is contained in order to bind particles onto the surface of the substrate 2 and bind the particles to each other. This resin material may have e.g. a three-dimensional network structure that is fibrillated and in which fibrils link mutually continuously. The second particles 4b are carried by this resin material having the three-dimensional network structure and thereby can keep the dispersed state without coupling to each other. Furthermore, the resin material may bind the surface of the substrate 2 and bind the particles to each other without being fibrillated. In this case, higher binding performance can be obtained.

The average particle size of the second particle 4b is e.g. at least 0.01 μm and at most 3.0 μm and preferably at least 0.1 μm and at most 1.0 μm. If it is smaller than 0.1 μm, coating tends to be difficult because the viscosity of the coating material becomes too high. Furthermore, if the average particle size surpasses 1.0 μm, it is difficult to ensure evenness of the coating film and the possibility of exposure of the substrate 2 becomes high, so that characteristics such as the oxidation resistance and the short-circuiting resistance tend to deteriorate.

It is preferable that the film thickness of the second region R2 is at least 1.5 μm in terms of ensuring the coating film evenness of the second particles 4b and suppressing exposure of the substrate 2 to further enhance the oxidation resistance and the heat resistance.

(Ratio between First Particles 4a and Second Particles 4b)

Regarding the ratio between the first particles 4a and the second particles 4b included in the surface layer 3, it is preferable that the volume ratio of the second particles 4b is at least 10% if the sum of the volumes of the first particles 4a and the second particles 4b is defined as 100. That is, it is preferable that the volume ratio of the second particles 4b is at least 10% with respect to the total volume of the first particles 4a and the second particles 4b. If the volume ratio of the second particles 4b is lower than 10%, the peeling resistance of the first particle 4a decreases.

(Confirmation of First Region and Second Region)

The first region R1 and the second region R2 can be confirmed by analyzing a section of the surface layer 3 by an FE-SEM (field emission scanning electron microscope, s-4800 made by Hitachi High-Technologies Corporation). Furthermore, if the composition is different between the first particle 4a and the second particle 4b, the first region R1 and the second region R2 can be confirmed by performing an elemental analysis.

The particles configuring the microparticles $4a_1$ forming the first particles 4a and the second particles 4b and the resin material included in the surface layer 3 will be described in detail below.

Both the microparticles $4a_1$ configuring the first particles 4a and the second particles 4b are electrically-insulating particles such as at least any of inorganic particles and organic particles.

(Inorganic Particle)

As the inorganic particle, particles of metal oxide, metal nitride, metal carbide, metal sulfide, and so forth, which are electrically-insulating inorganic particles, can be cited. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like can be favorably used. As the metal nitride, silicon nitride ($Si_3N_4$), aluminum nitride (AlN), boron nitride (BN), titanium nitride (TiN), or the like can be favorably used. As the metal carbide, silicon carbide (SiC), boron carbide ($B_4C$), or the like can be favorably used. As the metal sulfide, barium sulfate ($BaSO_4$) or the like can be favorably used. Furthermore, a mineral such as a porous aluminosilicate including zeolite ($M_{2/n}O \cdot Al_2O_3 \cdot xSiO_2 \cdot yH_2O$, M is a metallic element, $x \geq 2$, $y \geq 0$), a layered silicate, barium titanate ($BaTiO_3$), or strontium titanate ($SrTiO_3$) may be used. Among them, it is preferable to use alumina, titania (particularly one having a rutile structure), silica, or magnesia, and it is more preferable to use alumina. The inorganic particle has oxidation resistance and heat resistance and the surface layer 3 that contains inorganic particles and is the side surface opposed to the cathode has strong resistance even against an oxidizing environment near the cathode at the time of a charge. The shape of the inorganic particle is not particularly limited and any of spherical shape, ellipsoidal shape, plate shape, fiber shape, cubic shape, random shape, etc. can be used.

(Organic Particle)

As the material configuring the organic particle, the following resins and so forth that have high heat resistance and at least one of whose meting point and glass-transition temperature is at least 180 deg are cited: fluorine-containing resins such as polyvinylidene fluoride and polytetrafluoroethylene, fluorine-containing rubber such as vinylidene fluoride-tetrafluoroethylene copolymer and ethylene-tetrafluoroethylene copolymer, rubber such as styrene-butadiene copolymer or its hydride, acrylonitrile-butadiene copolymer or its hydride, acrylonitrile-butadiene-styrene copolymer or its hydride, methacrylate ester-acrylic ester copolymer, styrene-acrylic ester copolymer, acrylonitrile-acrylic ester copolymer, ethylene propylene rubber, polyvinyl alcohol, and polyvinyl acetate, cellulose derivatives such as ethylcellulose, methylcellulose, hydroxyethylcellulose, and carboxymethylcellulose, polyphenylene ether, polysulfone, polyethersulfone, polyphenylene sulfide, polyetherimide, polyimide, polyamide including wholly aromatic polyamide (aramid), polyamide-imide, polyacrylonitrile, polyvinyl alcohol, polyether, acrylic acid resin, polyester, or the like. These materials may be used alone or may be used with mixing of two or more kinds. Among them, a fluorine-based resin such as polyvinylidene fluoride is preferable in view of oxidation resistance and flexibility and it is preferable to contain aramid or polyamide-imide in view of heat resistance. The shape of the organic particle is not particularly limited and any of spherical shape, ellipsoidal shape, plate shape, fiber shape, cubic shape, random shape, etc. can be used.

The microparticles $4a_1$ configuring the first particles $4a$ and the second particles $4b$ may be configured by particles of a single kind of material. Alternatively, the microparticles $4a_1$ configuring the first particles $4a$ may be configured by a single kind of material and the second particles $4b$ may be configured by a different single kind of material from that of the microparticles $4a_1$ configuring the first particles $4a$. Alternatively, the microparticles $4a_1$ configuring the first particles $4a$ may be configured by plural kinds of materials and the second particles $4b$ may be configured by different plural kinds of materials from those of the microparticles $4a_1$ configuring the first particles $4a$. Alternatively, the microparticles $4a_1$ configuring the first particles $4a$ may be configured by plural kinds of materials and the second particles $4b$ may be configured by the same plural kinds of materials as those of the microparticles $4a_1$ configuring the first particles $4a$.

(Resin Material)

As the resin material configuring the surface layer 3, the following resins and so forth that have high heat resistance and at least one of whose meting point and glass-transition temperature is at least 180 deg are cited: fluorine-containing resins such as polyvinylidene fluoride and polytetrafluoroethylene, fluorine-containing rubber such as vinylidene fluoride-tetrafluoroethylene copolymer and ethylene-tetrafluoroethylene copolymer, rubber such as styrene-butadiene copolymer or its hydride, acrylonitrile-butadiene copolymer or its hydride, acrylonitrile-butadiene-styrene copolymer or its hydride, methacrylate ester-acrylic ester copolymer, styrene-acrylic ester copolymer, acrylonitrile-acrylic ester copolymer, ethylene propylene rubber, polyvinyl alcohol, and polyvinyl acetate, cellulose derivatives such as ethylcellulose, methylcellulose, hydroxyethylcellulose, and carboxymethylcellulose, polyphenylene ether, polysulfone, polyethersulfone, polyphenylene sulfide, polyetherimide, polyimide, polyamide including wholly aromatic polyamide (aramid), polyamide-imide, polyacrylonitrile, polyvinyl alcohol, polyether, acrylic acid resin, polyester, or the like. These resin materials may be used alone or may be used with mixing of two or more kinds. Among them, a fluorine-based resin such as polyvinylidene fluoride is preferable in view of oxidation resistance and flexibility and it is preferable to contain aramid or polyamide-imide in view of heat resistance.

It is preferable that the thickness of the surface layer 3 per single surface before collapse of the first particles $4a$ is set to e.g. at least 3.5 μm and at most 20 μm. If the thickness is small outside the above range, the function to absorb expansion of the anode is lowered. Furthermore, if the thickness is large outside the above range, the thickness of the separator itself becomes large, which leads to the lowering of the volume efficiency of the battery. The surface layer 3 has a concave-convex shape and does not have a uniform film thickness. As a film thickness meter used for measurement of the thickness of the surface layer 3, for example the thickness can be measured by a circular flat indenter with a diameter of 6 mm made by Mitutoyo Corporation under a pressing condition of 1.8 kg/cm$^2$.

(Manufacturing Method of Separator)

A manufacturing method of the separator provided with the surface layer 3 will be described below.

First, a resin solution for forming the surface layer 3 is prepared. The resin material, the first particles $4a$, and the second particles $4b$ configuring the surface layer 3 are mixed at a predetermined ratio and the mixture is added to a dispersion solvent such as N-methyl-2-pyrrolidone to dissolve the resin material, so that the resin solution is obtained.

As the dispersion solvent used for the resin solution, any solvent can be used as long as it is a solvent that can dissolve the resin material of the present technique. As the dispersion solvent, for example, besides N-methyl-2-pyrrolidone, dimethylacetamide, dimethylformamide, dimethylsulfoxide, toluene, acetonitrile, or the like is used. However, it is preferable to use N-methyl-2-pyrrolidone in view of solubility and high dispersibility.

Next, the surface layer 3 is formed on the surface of the substrate 2. A coating layer is formed by applying the resin solution on at least one surface of the substrate 2. Next, the substrate 2 on which the coating layer is formed is immersed in water or the like as a coagulating liquid and then dried. This forms the surface layer 3 having the first regions R1 configured by the first particles 4a and the second region R2 configured by the second particles 4b and the resin material. The coagulating liquid in which the substrate 2 on which the coating layer is formed is immersed is e.g. water or the like, which is, with respect to the resin solution, a poor solvent for the resin material dissolved in the resin solution and is a good solvent for the dispersion solvent that dissolves the resin material. A solvent exchange occurs by bringing the resin solution that dissolves the resin material and contains the first particles 4a and the second particles 4b into contact with a solvent such as water, which is a poor solvent for the resin material and a good solvent for the dispersion solvent that dissolves the resin material. Due to this, a rapid (high-speed) phase separation accompanied by spinodal decomposition occurs and the resin material is fixed to a peculiar three-dimensional network structure. The second region R2 of the surface layer 3 fabricated in this manner forms a peculiar porous structure by utilizing a rapid poor-solvent-induced phase separation phenomenon accompanied by spinodal decomposition, by the poor solvent. Moreover, by this structure, excellent non-aqueous electrolyte solution impregnation and ion conductivity can be realized. Furthermore, when the surface layer 3 is formed on the surface of the substrate 2, it may be formed by being directly dried without being immersed in a coagulating liquid. In this case, although the resin material does not become a peculiar three-dimensional network structure, it is possible to tightly bind the substrate surface and tightly bind the particles to each other. By the above, the separator of the present technique can be obtained.

(Effects)

In the separator of the present technique, the surface layer 3 containing the first particles 4a, the second particles 4b, and the resin material can give oxidation resistance, heat resistance, and mechanical strength to the substrate 2 of a polyolefin microporous membrane or the like.

If the separator of the present technique is used for a battery, when the anode expands at the time of a charge, the first particles 4a forming the first regions R1 receive the expansion pressure of the anode to collapse and be crushed. Due to this, the expanded volume of the anode is absorbed, which can suppress damage of battery members such as the anode current collector. After the collapse of the first particles 4a, the first regions R1 configured by the first particles 4a arising from aggregation of the microparticles 4a₁ and the second region R2 configured by the second particles 4b and the resin material are maintained. After the first particles 4a collapse and are crushed, the convex parts are substantially planarized due to the collapse and crushing of the first particles 4a and thereby the concavity and convexity of the surface layer 3 are alleviated. This can make the distance between the electrodes constant and thus suppress adverse effects such as the occurrence of potential unevenness.

The second particles 4b forming the second region R2 further enhance the oxidation resistance, heat resistance, and mechanical strength given to the substrate 2, and prevent drop of the first particles 4a included in the first regions R1. That is, the second particles 4b have a function to cover the exposed surface of the substrate 2 that is among the first particles 4a and is not covered by the first particle 4a to further enhance the oxidation resistance and heat resistance given to the substrate 2. The second particles 4b have a function to prevent drop of the first particles 4a. That is, the second particles 4b covering the surface of the substrate 2 form a foundation layer serving as the foundation of the first particles 4a and the first particles 4a are so disposed that part of the first particles 4a is buried into this foundation layer. This makes the bonding area of the first particles 4a larger and thus can suppress drop of the first particles 4a.

On the other hand, for example, if forming the surface layer 3 by only the first particles 4a is attempted, the particles cannot be uniformly applied because the particle size is large, and the substrate 2 is exposed at the gap among the particles. Therefore, oxidation resistance and heat resistance cannot be ensured. Furthermore, if the coating amount of resin solution (coating material) for forming the surface layer 3 is increased to closely pack the particles, overlapping of the particles suddenly increases the film thickness. Besides, there is a fear of the occurrence of the following problems. It is difficult to give mechanical strength because the particles are large. Furthermore, peeling resistance is poor and the particles easily drop. Moreover, the specific surface area of the particles is large. Thus, the coating material viscosity rises and the solid content decreases. Therefore, a large amount of solvent coating material needs to be used, which imposes a burden on the environments and solvent removal.

Furthermore, for example, if the first particles 4a are not collapsible particles, a crushing amount of the surface layer 3 cannot be ensured. For example, if it is attempted to ensure a crushing amount equivalent to that when collapsible particles are used by using particles without collapsibility instead of collapsible particles, the substrate 2 is compressed and there is a fear of the occurrence of problems that the air permeability rises and the concave-convex structure remains left to cause the occurrence of potential unevenness.

In the present technique, if drop of many first particles 4a occurs at the time of fabrication of the coating film or handling, the substrate 2 is exposed and therefore the required effects such as heat resistance and oxidation resistance decrease. For example, if the first particles 4a alone are applied on the substrate 2 or if the volume ratio of the second particles 4b is insufficient, trace of drop of the first particles 4a is observed from a surface observation by an FE-SEM (Field Emission-Scanning Electron Microscope). On the other hand, if part of the first particles 4a is buried in the second particles 4b like the present technique, drop of the first particles 4a cannot be confirmed from the surface observation by an FE-SEM. The drop will be prevented due to increase in the area of bonding of the first particles 4a. That is, it is important that the coating material containing the first particles 4a and the second particles 4b is applied at one time and at least part of the first particles 4a is covered by the second particles 4b. For example, in a two-stage system in which first a layer of the second particles 4b is formed and thereafter a layer of the first particle 4a is formed, the first particles 4a are not buried into the layer of the second particles 4b and therefore drop of the first particles 4a cannot be prevented.

The separator of the present technique exerts noticeable effects by being applied to a battery in which an alloy-based anode material containing an element that can form an alloy with lithium is used as the anode active material. In the anode for which an alloy-based anode material is used as the anode active material, expansion at the time of a charge is significant. Therefore, if the separator of the present technique is applied to a battery in which an alloy-based anode material is used as the anode active material, the effect of prevention of damage and breaking of the electrode due to absorption of the expansion of the anode by the surface layer 3 becomes higher. The separator of the present technique may be applied to a battery in which a carbon material such as graphite is used as the anode active material.

The separator of the present technique exerts more noticeable effects by being applied to a battery including a wound electrode body in which the cathode and anode are stacked with the intermediary of the separator and are wound. In the wound electrode body, tensile stress is applied in the winding direction of the anode current collector in association with expansion of the anode and therefore plastic deformation of the anode current collector occurs more readily compared with a stacked electrode body. In this case, cracking, peeling-off, peeling-down, or the like occurs also in the anode active material layer. Furthermore, if the tensile stress is large, there is a fear that the anode current collector breaks. By using the separator of the present technique, the burden on the electrode attributed to the wound structure of the wound electrode body can be reduced and the effect of prevention of damage and breaking of the electrode becomes much higher.

If the surface layer using heat-resistant particles is provided in order to obtain heat resistance in the polyolefin microporous membrane that is described in the above-mentioned Patent Literature 1 (PCT Patent Publication No. WO08/053898) and has concavity and convexity, the formed concavity and convexity are filled and therefore this is not preferable. Furthermore, the pore size of the polyolefin microporous membrane is small. Thus, if a space exists between the electrode and the separator, the concave-convex structure induces potential unevenness to cause the deterioration of the load characteristics of the battery and generation of a dendrite. In a high-capacity battery using an alloy-based anode material for the anode, it is required to give the separator both the capability of expansion absorption and oxidation resistance and heat resistance. However, according to the knowledge of the inventor of the present application and so forth, an existing technique relating to fabrication of the surface layer having a high compression characteristic by use of existing heat-resistance particles does not exist.

2. Second Embodiment

Configuration of Battery

A non-aqueous electrolyte battery according to a second embodiment of the present technique will be described. The non-aqueous electrolyte battery according to the second embodiment of the present technique is a non-aqueous electrolyte battery using the separator according to the first embodiment of the present technique.

Figure 4:
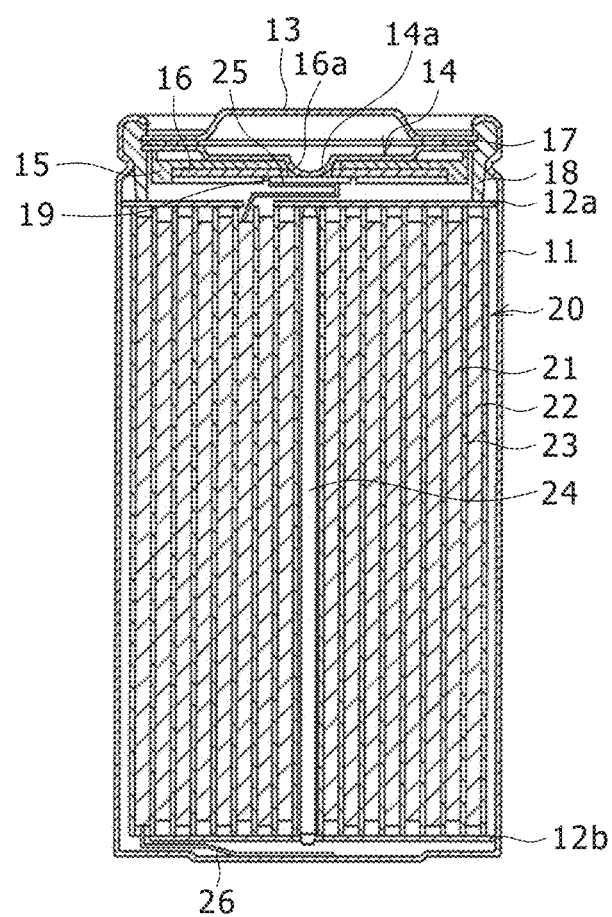
FIG. 4 is a sectional view showing one example of a non-aqueous electrolyte battery according to a second embodiment of the present technique.

With reference to FIG. 4, the structure of the non-aqueous electrolyte battery according to the second embodiment of the present technique will be described. FIG. 4 is a sectional view showing one example of the non-aqueous electrolyte battery according to the second embodiment of the present technique. The non-aqueous electrolyte battery is e.g. a non-aqueous electrolyte secondary battery capable of charge and discharge. This non-aqueous electrolyte battery is one referred to as a so-called cylindrical type and has, inside a battery can 11 having a substantially hollow columnar shape, a wound electrode body 20 obtained by winding a cathode 21 and an anode 22 having a strip shape together with a liquid non-aqueous electrolyte (hereinafter, referred to as non-aqueous electrolyte solution arbitrarily) that is not shown in the diagram with the intermediary of a separator 23 having the same configuration as that of the first embodiment of the present technique.

The battery can 11 is formed of e.g. iron for which nickel plating is performed. One end part is closed and the other end part is opened. Inside the battery can 11, a pair of insulating plates 12a and 12b are each disposed perpendicular to the winding circumferential surface in such a manner as to sandwich the wound electrode body 20.

As the material of the battery can 11, iron (Fe), nickel (Ni), stainless steel (SUS), aluminum (Al), titanium (Ti), etc. are cited. Plating with e.g. nickel or the like may be performed for this battery can 11 in order to prevent electrochemical corrosion by the non-aqueous electrolyte solution in association with change and discharge of the non-aqueous electrolyte battery. A battery lid 13 that is a cathode lead plate and a safety valve mechanism and a heat-sensitive resistor element (PTC element: Positive Temperature Coefficient) 17 provided inside this battery lid 13 are attached to the open end part of the battery can 11 by being caulked with the intermediary of a gasket 18 for insulation and sealing.

The battery lid 13 is formed of e.g. the same material as that of the battery can 11 and an opening part for exhausting a gas generated inside the battery is made. In the safety valve mechanism, a safety valve 14, a disk holder 15, and a blocking disk 16 are overlapped in turn. A protrusion 14a of the safety valve 14 is connected to a cathode lead 25 led out from the wound electrode body 20 via a sub-disk 19 that is so disposed as to cover a hole 16a made at the center part of the blocking disk 16. By the connection of the safety valve 14 and the cathode lead 25 via the sub-disk 19, drawing of the cathode lead 25 from the hole 16a at the time of reversal of the safety valve 14 is prevented. Furthermore, the safety valve mechanism is electrically connected to the battery lid 13 via the heat-sensitive resistor element 17.

The safety valve mechanism is a mechanism in which the safety valve 14 is reversed to break the electrical connection among the protrusion 14a, the battery lid 13, and the wound electrode body 20 if the internal pressure of the non-aqueous electrolyte battery becomes higher than certain pressure due to short-circuiting inside the battery or heating from the external of the battery or the like. Specifically, when the safety valve 14 is reversed, the cathode lead 25 is held by the blocking disk 16 and the connection between the safety valve 14 and the cathode lead 25 is broken. The disk holder 15 is composed of an insulating material and the safety valve 14 and the blocking disk 16 are insulated if the safety valve 14 is reversed.

Furthermore, if the gas is further generated inside the battery and the battery internal pressure further rises, part of the safety valve 14 cracks so that the gas can be exhausted toward the battery lid 13.

Moreover, e.g. plural degassing holes (not shown) are made around the hole 16a of the blocking disk 16, which provides a configuration in which a gas can be effectively exhausted toward the battery lid 13 if the gas is generated from the wound electrode body 20.

The resistance value of the heat-sensitive resistor element 17 increases when the temperature rises, and the heat-sensitive resistor element 17 breaks the electrical connection between the battery lid 13 and the wound electrode body 20 to thereby block the current and prevent unusual heat generation due to an excessive current. The gasket 18 is formed of e.g. an insulating material and asphalt is applied on the surface.

The wound electrode body 20 housed in the non-aqueous electrolyte battery is wound around a center pin 24. The wound electrode body 20 is made by stacking the cathode 21 and the anode 22 in turn with the intermediary of the separator 23 and winding them in the longitudinal direction.

The cathode lead 25 is connected to the cathode 21 and an anode lead 26 is connected to the anode 22. The cathode lead 25 is welded to the safety valve 14 to be electrically connected to the battery lid 13 as described above and the anode lead 26 is welded and electrically connected to the battery can 11.

Figure 5:
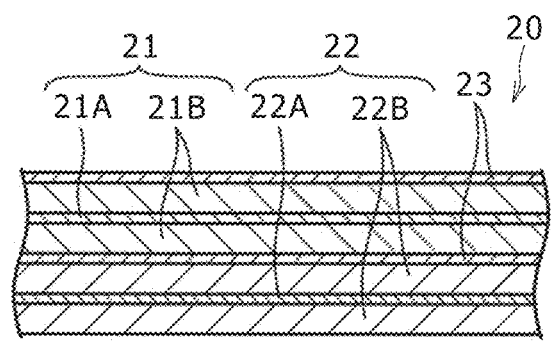
FIG. 5 is a sectional view magnifying and showing part of a wound electrode body 20 shown in FIG. 4.

FIG. 5 is a sectional view magnifying and showing part of the wound electrode body 20 shown in FIG. 4. The cathode 21, the anode 22, and the separator 23 will be described in detail below.

(Cathode)

The cathode 21 has e.g. a structure in which cathode active material layers 21B are provided on both surfaces of a cathode current collector 21A having the pair of opposing surfaces. Although not shown in the diagram, the cathode active material layer 21B may be provided on only a single surface of the cathode current collector 21A. The cathode current collector 21A is formed of e.g. a metal foil such as an aluminum foil.

The cathode active material layer 21B contains any one kind or two or more kinds of cathode materials capable of storing and releasing lithium as the cathode active material. The cathode active material layer 21B may contain other materials such as a binding agent and a conducting agent according to need.

As the cathode material capable of storing and releasing lithium, e.g. a lithium-containing compound such as lithium oxide, lithium phosphorus oxide, lithium sulfide, or intercalation compound containing lithium is adequate and two or more kinds of them may be used by mixture. To increase the energy density, a lithium-containing compound containing lithium, a transition metal element, and oxygen (O) is preferable. As such a lithium-containing compound, e.g. a lithium composite oxide shown in [Chem. I] and having a structure of the layered rock-salt type, a lithium composite phosphate shown in [Chem. II] and having a structure of the olivine type, and so forth are cited. As the lithium-containing compound, a compound containing at least one kind in the group consisting of cobalt (Co), nickel (Ni), manganese (Mn), and iron (Fe) as a transition metal element is more preferable. As such a lithium-containing compound, e.g. a lithium composite oxide shown in [Chem. III], [Chem. IV], or [Chem. V] and having a structure of the layered rock-salt type, a lithium composite oxide shown in [Chem. VI] and having a structure of the spinel type, a lithium composite phosphate shown in [Chem. VII] and having a structure of the olivine type, or the like is cited. Specifically, there is $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), or the like.

$$Li_pNi_{(1-q-r)}Mn_qM1_rO_{(1-y)}X_z \qquad \text{[Chem. I]}$$

(In the formula, M1 represents at least one kind among elements selected from group 2 to group 5 except nickel (Ni) and manganese (Mn). X represents at least one kind among group-16 elements and group-17 elements except oxygen (O). p, q, r, y, and z are values in ranges of 0≤p≤1.5, 0≤q≤1.0, 0≤r≤1.0, −0.10≤y≤0.20, and 0≤z≤0.2.)

$$Li_aM2_bPO_4 \qquad \text{[Chem. II]}$$

(In the formula, M2 represents at least one kind among elements selected from group 2 to group 15. a and b are values in ranges of 0≤a≤2.0 and 0.5≤b≤2.0.)

$$Li_jMn_{(1-g-h)}Ni_gM3_hO_{(1-j)}F_k \qquad \text{[Chem. III]}$$

(In the formula, M3 represents at least one kind in the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are values in ranges of 0.8≤f≤1.2, 0<g<0.5, 0≤h≤0.5, g+h<1, −0.1≤j≤0.2, and 0≤k≤0.1. The composition of lithium differs depending on the state of a charge/discharge and the value of f represents the value in the fully-discharged state.)

$$Li_mNi_{(1-n)}M4_nO_{(1-p)}F_q \qquad \text{[Chem. IV]}$$

(In the formula, M4 represents at least one kind in the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q are values in ranges of 0.8≤m≤1.2, 0.005≤n≤0.5, −0.1≤p≤0.2, and 0≤q≤0.1. The composition of lithium differs depending on the state of a charge/discharge and the value of m represents the value in the fully-discharged state.)

$$Li_rCo_{(1-s)}M5_sO_{(1-t)}F_u \qquad \text{[Chem. V]}$$

(In the formula, M5 represents at least one kind in the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u are values in ranges of 0.8≤r≤1.2, 0≤s<0.5, −0.1≤t≤0.2, and 0≤u≤0.1. The composition of lithium differs depending on the state of a charge/discharge and the value of r represents the value in the fully-discharged state.)

$$Li_vMn_{(1-w)}M6_wO_xF_y \qquad \text{[Chem. VI]}$$

(In the formula, M6 represents at least one kind in the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y are values in ranges of 0.9≤v≤1.1, 0≤w≤0.6, 3.7≤x≤4.1, and 0≤y≤0.1. The composition of lithium differs depending on the state of a charge/discharge and the value of v represents the value in the fully-discharged state.)

$$Li_zM7PO_4 \qquad \text{[Chem. VI]}$$

(In the formula, M7 represents at least one kind in the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z is a value in a range of 0.9≤z≤1.1. The composition of lithium differs depending on the state of a charge/discharge and the value of z represents the value in the fully-discharged state.)

Moreover, in view of achievement of higher electrode packing performance and cycle characteristics, composite particles obtained by covering the surface of core particles formed of any of the above-described lithium-containing compounds by microparticles formed of any of other lithium-containing compounds may be employed.

Besides, as the cathode material capable of storing and releasing lithium, e.g. oxide, disulfide, chalcogenide, conductive polymer, or the like is cited. The oxide is e.g. vanadium oxide ($V_2O_5$), titanium dioxide ($TiO_2$), manganese dioxide ($MnO_2$), or the like. The disulfide is e.g. iron disulfide ($FeS_2$), titanium disulfide ($TiS_2$), molybdenum disulfide (MoS$_2$), or the like. As the chalcogenide, particularly a layered compound and a spinel compound are preferable. For example, it is niobium selenide (NbSe$_2$) or the like. The conductive polymer is e.g. sulfur, polyaniline, polythiophene, polyacetylene, polypyrrole, or the like. Of course, the cathode material may be one other than the above-described materials. Furthermore, two or more kinds of the above-described series of cathode materials may be mixed in an arbitrary combination.

Furthermore, as the conducting agent, e.g. a carbon material such as carbon black or graphite or the like is used. As the binding agent, e.g. at least one kind selected from resin materials such as polyvinylidene fluoride (PVdF), polytetrafluoroethylene (PTFE), polyacrylonitrile (PAN), styrene butadiene rubber (SBR), and carboxymethylcellulose (CMC), copolymers based on these resin materials, and so forth is used.

(Anode)

The anode 22 has e.g. a structure in which anode active material layers 22B are provided on both surfaces of an anode current collector 22A having the pair of opposing surfaces. Although not shown in the diagram, the anode active material layer 22B may be provided on only a single surface of the anode current collector 22A. The anode current collector 22A is formed of e.g. a metal foil such as a copper foil.

The anode active material layer 22B is so configured as to contain, as the anode active material, any one kind or two or more kinds of the anode material capable of storing and releasing lithium, and may be so configured as to contain other materials such as the same conducting agent and binding agent as those of the cathode active material layer 21B according to need.

In this non-aqueous electrolyte battery, the electrochemical equivalent of the anode material capable of storing and releasing lithium is higher than the electrochemical equivalent of the cathode 21. Thus, in theory, the lithium metal does not precipitate on the anode 22 in the middle of a charge.

As the anode material capable of storing and releasing lithium, e.g. a carbon material such as non-graphitizing carbon, graphitizing carbon, graphite, pyrolytic carbons, cokes, glassy carbons, organic polymer compound baked body, carbon fiber, or activated carbon is cited. Among them, the cokes include pitch coke, needle coke, petroleum coke, or the like. The organic polymer compound baked body refers to a substance obtained by firing a polymer material such as a phenol resin or a furan resin at an adequate temperature to carbonize it, and part thereof is classified into non-graphitizing carbon or graphitizing carbon. In these carbon materials, change in the crystalline structure occurring at the time of a charge/discharge is very little. Thus, they are preferable because high charge/discharge capacity can be achieved and favorable cycle characteristics can be achieved. In particular, graphite is preferable because the electrochemical equivalent is large and high energy density can be achieved. Furthermore, non-graphitizing carbon is preferable because excellent cycle characteristics are achieved. Moreover, a substance whose charge/discharge potential is low, specifically a substance whose charge/discharge potential is close to that of the lithium metal, is preferable because increase in the energy density of the battery can be easily realized.

As the anode material capable of storing and releasing lithium, a material that is capable of storing and releasing lithium and contains at least one kind among metallic elements and metalloid elements as a constituent element is also cited. This is because high energy density can be achieved if such a material is used. In particular, using it with a carbon material is more preferable because high energy density can be achieved and excellent cycle characteristics can be achieved. This anode material may be any of a single substance, an alloy, and a compound of a metallic element or a metalloid element. Furthermore, it may be a substance having a phase of one kind or two or more kinds of them in at least part thereof. In the present technique, in addition to a substance composed of two or more kinds of metallic elements, a substance containing one or more kinds of metallic elements and one or more kinds of metalloid elements is also included in the alloy. Furthermore, the alloy may contain a non-metallic element. In some alloys, solid solution, eutectic (eutectic mixture), intermetallic compound, or two or more kinds of them coexist in the composition thereof.

As the metallic element or metalloid element configuring this anode material, e.g. a metallic element or a metalloid element capable of forming an alloy with lithium is cited. Such an anode material containing an element capable of forming an alloy with lithium is referred to as an alloy-based anode material. As the metallic element or metalloid element capable of forming an alloy with lithium, specifically, magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt) is cited. They may be either a crystalline substance or an amorphous substance.

As the anode material, a substance containing a metallic element or a metalloid element of group 4B in the short-form periodic table as a constituent element is preferable. A substance containing at least one of silicon (Si) and tin (Sn) as a constituent element is more preferable and a substance containing at least silicon is particularly preferable. This is because silicon (Si) and tin (Sn) have high capability of storing and releasing lithium and high energy density can be achieved. As the anode material having at least one kind of silicon and tin, e.g. a single substance, alloy, or compound of silicon, a single substance, alloy, or compound of tin, and a material having a phase of one kind or two or more kinds of them in at least part thereof are cited.

As an alloy of silicon, e.g. a substance containing, as a second constituent element other than silicon, at least one kind in the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) is cited. As an alloy of tin, e.g. a substance containing, as a second constituent element other than tin (Sn), at least one kind in the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) is cited.

As a compound of tin (Sn) or a compound of silicon (Si), e.g. a substance containing oxygen (O) or carbon (C) is cited. The compound may contain the above-described second constituent element in addition to tin (Sn) or silicon (Si).

Above all, as this anode material, a SnCoC-containing material that contains cobalt (Co), tin (Sn), and carbon (C) as constituent elements and in which the content of carbon is at least 9.9 mass % and at most 29.7 mass % and the ratio of cobalt (Co) to the total of tin (Sn) and cobalt (Co) is at least 30 mass % and at most 70 mass % is preferable. This is because, in such a composition range, high energy density can be achieved and excellent cycle characteristics can be achieved.

This SnCoC-containing material may contain further another constituent element according to need. As another constituent element, e.g. silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi) is preferable and the material may contain two or more kinds. This is because the capacity or cycle characteristics can be further enhanced.

It is preferable that this SnCoC-containing material has a phase containing tin (Sn), cobalt (Co), and carbon (C) and this phase has a low-crystalline or amorphous structure. Furthermore, in this SnCoC-containing material, it is preferable that at least part of carbon (C), which is a constituent element, is bonded to a metallic element or a metalloid element that is another constituent element. This is because the lowering of the cycle characteristics will be attributed to aggregation or crystallization of tin (Sn) and so forth and bonding of carbon (C) to another element can suppress such aggregation or crystallization.

As a measurement method to investigate the bonding state of elements, e.g. an X-ray photoelectron spectroscopy (XPS) is cited. In the XPS, in graphite, the peak of the 1s orbital of carbon (C1s) appears at 284.5 eV in apparatus in which energy calibration is so performed that the peak of the 4f orbital of the gold atom (Au4f) is obtained at 84.0 eV. Furthermore, in surface contamination carbon, the peak appears at 284.8 eV. In contrast, if the charge density of the carbon element becomes high, for example if carbon is bonded to a metallic element or a metalloid element, the peak of C1s appears in a region lower than 284.5 eV. That is, if the peak of the synthetic wave of C1s obtained about the SnCoC-containing material appears in a region lower than 284.5 eV, at least part of carbon contained in the SnCoC-containing material is bonded to a metallic element or a metalloid element that is another constituent element.

In the XPS measurement, e.g. the peak of C1s is used for correction of the energy axis of the spectrum. Because normally surface contamination carbon exists on the surface, the peak of C1s of surface contamination carbon is set to 284.8 eV and it is employed as the energy standard. In the XPS measurement, the waveform of the peak of C1s is obtained as a form including the peak of surface contamination carbon and the peak of carbon in the SnCoC-containing material. Therefore, for example by performing an analysis by using commercially-available software, the peak of the surface contamination carbon and the peak of the carbon in the SnCoC-containing material are separated. In the analysis of the waveform, the position of the main peak existing on the lowest binding energy side is employed as the energy standard (284.8 eV).

Furthermore, as the anode material capable of storing and releasing lithium, e.g. a metal oxide or a polymer compound capable of storing and releasing lithium or the like is also cited. The metal oxide is e.g. lithium titanate ($Li_4Ti_5O_{12}$), iron oxide, ruthenium oxide, molybdenum oxide, or the like and the polymer compound is e.g. polyacetylene, polyaniline, polypyrrole, or the like.

The anode material capable of storing and releasing lithium may be one other than the above-described materials. Furthermore, two or more kinds of the above-described anode materials may be combined in an arbitrary combination.

The anode active material layer 22B may be formed by any of e.g. gas phase method, liquid phase method, thermal spraying method, sintering method, or coating and two or more of them may be combined. In the case of forming the anode active material layer 22B by using gas phase method, liquid phase method, thermal spraying method, or sintering method or two or more kinds of them, it is preferable that alloying occurs at at least part of the interface between the anode active material layer 22B and the anode current collector 22A. Specifically, it is preferable that a constituent element of the anode current collector 22A diffuses into the anode active material layer 22B at the interface, or a constituent element of the anode active material layer 22B diffuses into the anode current collector 22A, or these constituent elements diffuse into each other. This is because breaking due to expansion and contraction of the anode active material layer 22B in association with charge and discharge can be suppressed and the electron conductivity between the anode active material layer 22B and the anode current collector 22A can be enhanced.

As the gas phase method, e.g. a physical deposition method or a chemical deposition method, specifically vacuum evaporation method, sputtering method, ion plating method, laser ablation method, thermal chemical vapor deposition (CVD; Chemical Vapor Deposition) method, plasma chemical vapor deposition method, or the like is cited. As the liquid phase method, a publicly-known technique such as electroplating or electroless plating can be used. The sintering method is e.g. a method in which particulate anode active materials are mixed with a binding agent and so forth and dispersed in a solvent to thereby be applied and then heat treatment is performed at a temperature higher than the melting point of the binding agent and so forth. A publicly-known technique can be utilized also regarding the sintering method, and e.g. atmosphere sintering method, reaction sintering method, or hot-press sintering method is cited.

(Separator)

The separator 23 is the same as the first embodiment.

(Non-Aqueous Electrolyte Solution)

The non-aqueous electrolyte solution contains an electrolyte salt and a non-aqueous solvent that dissolves this electrolyte salt.

The electrolyte salt contains e.g. one kind or two or more kinds of light metal compounds such as a lithium salt. As this lithium salt, e.g. lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), or the like is cited. Among them, at least one kind in the group consisting of lithium hexafluorophosphate, lithium tetrafluoroborate, lithium perchlorate, and lithium hexafluoroarsenate is preferable and lithium hexafluorophosphate is more preferable.

As the non-aqueous solvent, e.g. the following non-aqueous solvent is cited: lactone-based solvent such as γ-butyrolactone, γ-valerolactone, δ-valerolactone, or ε-caprolactone, carbonate ester-based solvent such as ethylene carbonate, propylene carbonate, butylene carbonate, vinylene carbonate, dimethyl carbonate, ethyl methyl carbonate, or diethyl carbonate, ether-based solvent such as 1,2-dimethoxyethane, 1-ethoxy-2-methoxyethane, 1,2-diethoxyethane, tetrahydrofuran, or 2-methyltetrahydrofuran, nitrile-based solvent such as acetonitrile, sulfolane-based solvent, phosphoric acids, phosphate ester solvent, pyrrolidones, or the like. As the non-aqueous solvent, any one kind may be used alone or two or more kinds may be used by mixture.

Furthermore, as the non-aqueous solvent, it is preferable to use cyclic carbonate ester and chain carbonate ester by mixture and it is more preferable that part or all of hydrogen of the cyclic carbonate ester or chain carbonate ester contain a fluoridized compound. It is preferable to use fluoroethylene carbonate (4-fluoro-1,3-dioxolan-2-one: FEC) or difluoroethylene carbonate (4,5-difluoro-1,3-dioxolan-2-one: DFEC) as this fluoridized compound. This is because the charge/discharge cycle characteristics can be enhanced even if the anode 22 containing a compound such as silicon (Si), tin (Sn), or germanium (Ge) as the anode active material is used. Among them, it is preferable to use difluoroethylene carbonate as the non-aqueous solvent. This is because it is excellent in the effect to improve the cycle characteristics.

Furthermore, the non-aqueous electrolyte solution may be held by a polymer compound to be turned to a gel electrolyte. The polymer compound to hold the non-aqueous electrolyte solution may be any as long as it absorbs the non-aqueous solvent to cause gelation, and e.g. a fluorine-based polymer compound such as a copolymer containing polyvinylidene fluoride (PVdF) or vinylidene fluoride (VdF) and hexafluoropropylene (HEP) as the repeating unit, an ether-based polymer compound such as polyethylene oxide (PEO) or a cross-linked body containing polyethylene oxide (PEO), a substance containing polyacrylonitrile (PAN), polypropylene oxide (PPO), or polymethyl methacrylate (PMMA) as the repeating unit, or the like is cited. As the polymer compound, any one kind may be used alone or two or more kinds may be used by mixture.

In particular, in view of oxidation-reduction stability, fluorine-based polymer compounds are desirable. Among them, a copolymer containing vinylidene fluoride and hexafluoropropylene as components is preferable. Moreover, this copolymer may contain, as a component, monoester of an unsaturated diprotic acid, such as maleic acid monomethyl ester (MMM), halogenated ethylene such as polychlorotrifluoroethylene (PCTFE), cyclic carbonate ester of an unsaturated compound, such as vinylene carbonate (VC), epoxy-group-containing acrylic vinyl monomer, or the like. This is because higher characteristics can be achieved.

(Manufacturing Method of Battery)
(Manufacturing Method of Cathode)

A cathode active material, a conducting agent, and a binding agent are mixed to prepare a cathode mix and this cathode mix is dispersed in a solvent such as N-methyl-2-pyrrolidone to make paste-like cathode mix slurry. Next, this cathode mix slurry is applied on the cathode current collector 21A and the solvent is dried. Then, compression molding is performed by a roll-press machine or the like to thereby form the cathode active material layer 21B, so that the cathode 21 is fabricated.

(Manufacturing Method of Anode)

An anode active material and a binding agent are mixed to prepare an anode mix and this anode mix is dispersed in a solvent such as N-methyl-2-pyrrolidone to make paste-like anode mix slurry. Next, this anode mix slurry is applied on the anode current collector 22A and the solvent is dried. Then, compression molding is performed by a roll-press machine or the like to thereby form the anode active material layer 22B, so that the anode 22 is fabricated.

(Preparation of Non-Aqueous Electrolyte Solution)

The non-aqueous electrolyte solution is prepared by dissolving an electrolyte salt in a non-aqueous solvent.

(Assembly of Battery)

The cathode lead 25 is attached to the cathode current collector 21A by welding or the like and the anode lead 26 is attached to the anode current collector 22A by welding or the like. Thereafter, the cathode 21 and the anode 22 are wound with the intermediary of the separator 23 of the present technique to be turned to the wound electrode body 20.

Subsequently, the tip part of the cathode lead 25 is welded to the safety valve mechanism and the tip part of the anode lead 26 is welded to the battery can 11. Thereafter, the wound surface of the wound electrode body 20 is sandwiched by the pair of insulating plates 12a and 12b and is housed inside the battery can 11. After the wound electrode body 20 is housed inside the battery can 11, the non-aqueous electrolyte solution is injected to the inside of the battery can 11 to impregnate the separator 23 with it. Thereafter, the battery lid 13, the safety valve mechanism composed of the safety valve 14 and so forth, and the heat-sensitive resistor element 17 are fixed to the open end part of the battery can 11 by being caulked with the intermediary of the gasket 18. Thereby, the non-aqueous electrolyte battery of the present technique shown in FIG. 4 is formed.

In this non-aqueous electrolyte battery, when a charge is performed, for example lithium ions are released from the cathode active material layers 21B to be stored in the anode active material layers 22B via the non-aqueous electrolyte solution with which the separator 23 is impregnated. Furthermore, when a discharge is performed, for example lithium ions are released from the anode active material layers 22B to be stored in the cathode active material layers 21B via the non-aqueous electrolyte solution with which the separator 23 is impregnated.

3. Third Embodiment

Configuration of Battery

Figure 6:
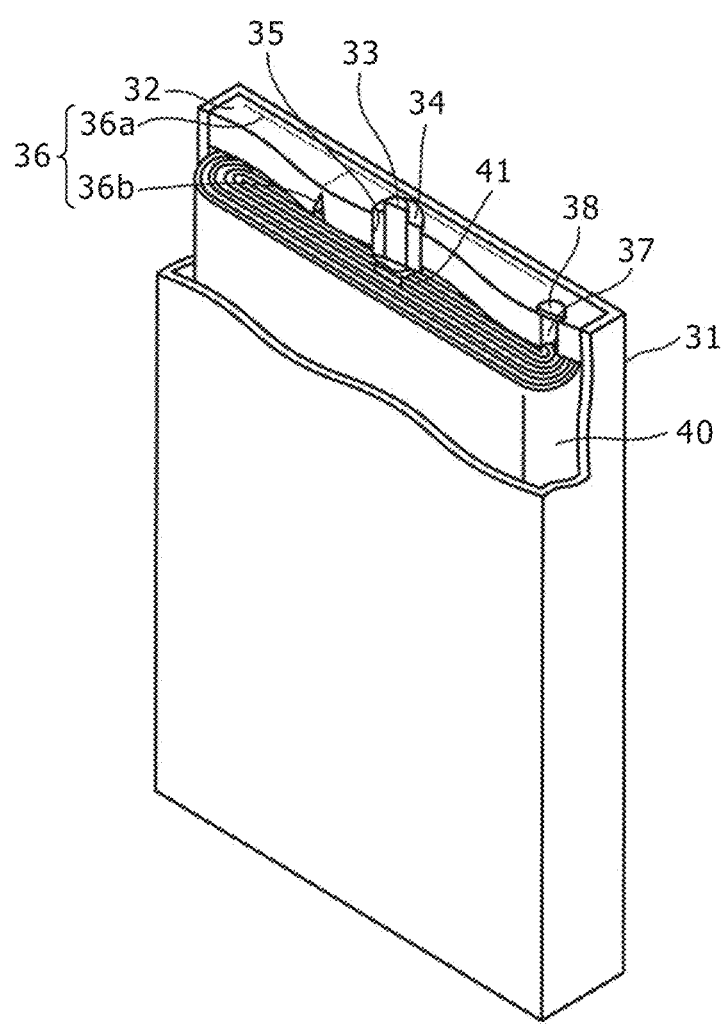
FIG. 6 is a perspective view showing the configuration of a non-aqueous electrolyte battery according to a third embodiment of the present technique.

A non-aqueous electrolyte battery according to a third embodiment of the present technique will be described. FIG. 6 is a perspective view showing the configuration of the non-aqueous electrolyte battery according to the third embodiment of the present technique. This non-aqueous electrolyte battery is a so-called square battery and is one in which a wound electrode body 40 is housed in a square exterior can 31.

The non-aqueous electrolyte battery is composed of the square cylindrical exterior can 31, the wound electrode body 40 that is an electric generating element housed in this exterior can 31, a battery lid 32 that closes the opening part of the exterior can 31, an electrode pin 33 provided at substantially the center part of the battery lid 32, and so forth.

The exterior can 31 is formed as a hollow, bottomed square cylindrical body by a metal having electrical conductivity, such as iron (Fe), for example. It is preferable to provide a configuration to enhance the electrical conductivity of the exterior can 31 e.g. by performing nickel plating, applying an electrically-conductive coating material, or the like for the inner surface of this exterior can 31. Furthermore, the outer circumferential surface of the exterior can 31 may be protected by being covered by an exterior label formed by a plastic sheet, paper, or the like or being coated with an insulating coating material for example. The battery lid 32 is formed by e.g. a metal having electrical conductivity, such as iron (Fe), as with the exterior can 31.

The wound electrode body 40 has a configuration similar to that of the second embodiment and is obtained by stacking cathode and anode with the intermediary of the separator according to the first embodiment of the present technique and winding them into an elongated oval shape. The cathode, the anode, the separator, and the non-aqueous electrolyte solution are the same as those of the second embodiment and therefore detailed description is omitted. Furthermore, a gel non-aqueous electrolyte layer (gel electrolyte layer) obtained by making a polymer compound hold the non-aqueous electrolyte solution may be formed between the cathode and anode and the separator.

For the wound electrode body 40 having such a configuration, a large number of cathode terminals 41 connected to a cathode current collector and a large number of anode terminals connected to an anode current collector are provided. All of the cathode terminals 41 and the anode terminals are led out to one end of the wound electrode body 40 in the axial direction. Furthermore, the cathode terminals 41 are connected to the lower end of the electrode pin 33 by a fixing measure such as welding. Furthermore, the anode terminals are connected to the inner surface of the exterior can 31 by a fixing measure such as welding.

The electrode pin 33 is formed of an electrically-conductive shaft member and is held by an insulator 34 in the state in which its head part is protruded to the upper end. The electrode pin 33 is fixed to substantially the center part of the battery lid 32 with the intermediary of this insulator 34. The insulator 34 is formed of a highly-insulating material and is fitted into a penetration hole 35 made on the surface side of the battery lid 32. Furthermore, the electrode pin 33 is made to penetrate through the penetration hole 35 and the tip parts of the cathode terminals 41 are fixed to its lower end surface.

The battery lid 32 provided with such an electrode pin 33 and so forth is fitted to the opening part of the exterior can 31 and the contact surfaces of the exterior can 31 and the battery lid 32 are bonded by a fixing measure such as welding. Thereby, the opening part of the exterior can 31 is sealed by the battery lid 32 and the configuration is made air-tightly and liquid-tightly. This battery lid 32 is provided with an internal pressure release mechanism 36 that breaks part of the battery lid 32 to let out (release) the internal pressure to the external when the pressure in the exterior can 31 rises to a predetermined value or higher.

The internal pressure release mechanism 36 is composed of two first opening grooves 36a (one first opening groove 36a is not shown in the diagram) linearly extended in the inner surface of the battery lid 32 along the longitudinal direction and a second opening groove 36b that is extended in the inner surface of the battery lid 32 likewise along the width direction perpendicular to the longitudinal direction and whose both ends are made to communicate with the first opening grooves 36a. The two first opening grooves 36a are made in parallel to each other near the inside of two long sides that are so located as to be opposed in the width direction of the battery lid 32 along the outer edges of the long sides of the battery lid 32. Furthermore, the second opening groove 36b is so made as to be located at substantially the center part between the outer edge of one short side and the electrode pin 33 on one side of the longitudinal direction of the electrode pin 33.

For example, the sectional shapes of both of the first opening groove 36a and the second opening groove 36b are set to a V-shape opened toward the lower surface. The shapes of the first opening groove 36a and the second opening groove 36b are not limited to the V-shape shown in this embodiment. For example, the shapes of the first opening groove 36a and the second opening groove 36b may be a U-shape or a semicircular shape.

An electrolyte solution injection port 37 is so made as to penetrate the battery lid 32. The electrolyte solution injection port 37 is used for pouring the non-aqueous electrolyte solution after the battery lid 32 and the exterior can 31 are caulked, and is sealed by a sealing member 38 after pouring of the non-aqueous electrolyte solution. Therefore, the electrolyte solution injection port 37 and the sealing member 38 do not have to be provided in the case of fabricating the wound electrode body by forming a gel electrolyte between the cathode and anode and the separator in advance.

(Separator)

The separator has the same configuration as that of the first embodiment.

(Non-Aqueous Electrolyte Solution)

As the non-aqueous electrolyte solution, one described in the second embodiment can be used. Furthermore, a gel electrolyte obtained by making a polymer compound hold the non-aqueous electrolyte solution, like one described in the second embodiment, may be used.

(Manufacturing Method of Battery)

This non-aqueous electrolyte battery can be manufactured as follows for example.

(Manufacturing Method of Cathode and Anode)

The cathode and anode can be fabricated by the same method as that of the second embodiment.

(Assembly of Battery)

Similarly to the second embodiment, the cathode, the anode, and the separator of the present technique are stacked in turn and wound to fabricate the wound electrode body 40 wound into an elongated oval shape. Subsequently, the wound electrode body 40 is housed in the exterior can 31 that is a square can formed of e.g. a metal such as aluminum (Al) or iron (Fe).

Then, the electrode pin 33 provided for the battery lid 32 and the cathode terminals 41 led out from the wound electrode body 40 are connected and thereafter the opening is sealed by the battery lid 32. Then, the non-aqueous electrolyte solution is injected from the electrolyte solution injection port 37 under reduced pressure for example and sealing is carried out by the sealing member 38. By the above, this non-aqueous electrolyte battery can be achieved.

4. Fourth Embodiment

Configuration of Battery

A non-aqueous electrolyte battery according to a fourth embodiment of the present technique will be described. The fourth embodiment is a non-aqueous electrolyte battery of a laminate film type using the separator according to the first embodiment.

Figure 7:
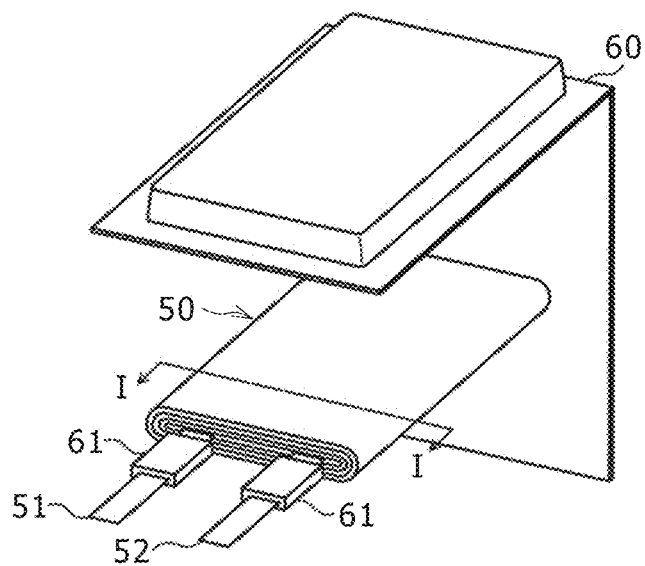
FIG. 7 is an exploded perspective view showing the configuration of a non-aqueous electrolyte battery according to a fourth embodiment of the present technique.

FIG. 7 is an exploded perspective view showing the configuration of the non-aqueous electrolyte battery according to the fourth embodiment of the present technique. This non-aqueous electrolyte battery is referred to as a so-called laminate film type and is one in which a wound electrode body 50 to which a cathode lead 51 and an anode lead 52 are attached is housed inside a film-shaped exterior member 60.

The cathode lead 51 and the anode lead 52 are each led out in e.g. the same direction from the inside of the exterior member 60 toward the outside. The cathode lead 51 and the anode lead 52 are each formed of a metal material such as aluminum, copper, nickel, stainless steel, or the like and are each formed into a thin plate shape or a mesh shape, for example.

The exterior member 60 is formed of e.g. a laminate film in which a resin layer is formed on both surfaces of a metal layer. In the laminate film, an outside resin layer is formed on the surface exposed to the battery outside, of the metal layer, and an inside resin layer is formed on the battery inside surface opposed to the electric generating element such as the wound electrode body 50.

The metal layer assumes the most important role of preventing entry of water, oxygen, and light to protect the contents and aluminum (Al) is most frequently used because of lightness, extensibility, price, and easiness of processing. The outside resin layer has beauty of the appearance, toughness, flexibility, and so forth and a resin material such as nylon, polyethylene terephthalate (PET), or the like is used. The inside resin layer is part that melts by heat or ultrasonic to be mutually fusion-bonded. Therefore, a polyolefin resin is adequate and cast polypropylene (CPP) is frequently used. An adhesive layer may be provided between the metal layer and the outside resin layer and the inside resin layer according to need.

In the exterior member 60, a recess that is formed in the direction from the inside resin layer side toward the outside resin layer by e.g. deep drawing and houses the wound electrode body 50 is made, and the inside resin layer is disposed opposed to the wound electrode body 50. The opposing inside resin layers of the exterior member 60 are brought into tight contact with each other at the outer peripheral part of the recess by fusion bonding or the like. Between the exterior member 60 and the cathode lead 51 and the anode lead 52, an adhesion film 61 for enhancing the adhesiveness between the inside resin layer of the exterior member 60 and the cathode lead 51 and the anode lead 52 composed of a metal material is disposed. The adhesion film 61 is formed of a resin material whose adhesiveness to the metal material is high and is configured by e.g. a polyolefin resin such as polyethylene, polypropylene, or modified polyethylene or modified polypropylene arising from modification of these materials.

Instead of the aluminum laminate film in which the metal layer is composed of aluminum (Al), the exterior member 60 may be configured by a laminate film having another structure, a polymer film of polypropylene or the like, or a metal film.

Figure 8:
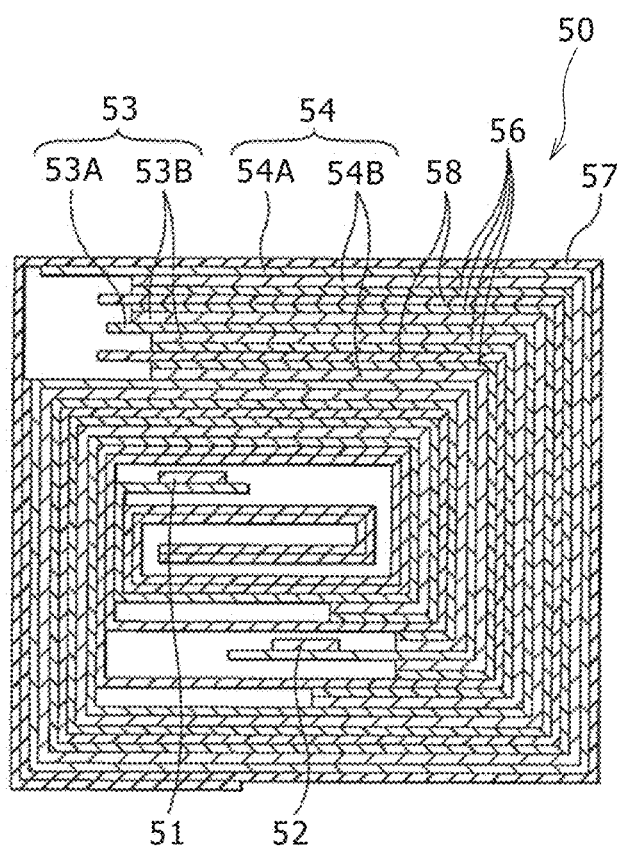
FIG. 8 is a sectional view showing a section along line I-I shown in FIG. 7.

FIG. 8 is a sectional view showing the sectional structure of the wound electrode body 50 shown in FIG. 7 along line I-I. The wound electrode body 50 is a component obtained by stacking a cathode 53 and an anode 54 with the intermediary of a separator 58 and a gel electrolyte 56 and winding them, and the outermost circumferential part is protected by a protective tape 57 according to need.

(Cathode)

The cathode 53 has a structure in which a cathode active material layer 53B is provided on a single surface or both surfaces of a cathode current collector 53A. The configuration of the cathode current collector 53A and the cathode active material layer 53B is the same as that of the cathode current collector 21A and the cathode active material layer 21B of the above-described third embodiment.

(Anode)

The anode 54 has a structure in which an anode active material layer 54B is provided on a single surface or both surfaces of an anode current collector 54A, and the anode active material layer 54B and the cathode active material layer 53B are disposed in an opposed manner. The configuration of the anode current collector 54A and the anode active material layer 54B is the same as that of the anode current collector 22A and the anode active material layer 22B of the above-described second embodiment.

(Separator)

The separator 58 is the same as the first embodiment.

(Non-Aqueous Electrolyte)

The gel electrolyte 56 is a non-aqueous electrolyte. It contains a non-aqueous electrolyte solution and a polymer compound serving as a holding body that holds the non-aqueous electrolyte solution, and is in a so-called gel manner. The gel electrolyte is preferable because high ion conductivity can be achieved and liquid leakage of the battery can be prevented. In the non-aqueous electrolyte battery according to the fourth embodiment, the same non-aqueous electrolyte solution as that of the second embodiment may be used instead of the gel electrolyte 56.

(Manufacturing Method of Battery)

This non-aqueous electrolyte battery can be manufactured as follows for example.

(Manufacturing Method of Cathode and Anode)

The cathode 53 and the anode 54 can be fabricated by the same method as that of the second embodiment.

(Assembly of Battery)

A precursor solution containing a non-aqueous electrolyte solution, a polymer compound, and a mixed solvent is applied on both surfaces of each of the cathode 53 and the anode 54 and the mixed solvent is volatilized to form the gel electrolyte 56. Thereafter, the cathode lead 51 is attached to the end part of the cathode current collector 53A by welding and the anode lead 52 is attached to the end part of the anode current collector 54A by welding.

Next, the cathode 53 and the anode 54 on which the gel electrolyte 56 is formed are stacked with the intermediary of the separator 58 to make a stacked body. Then, this stacked body is wound in its longitudinal direction and the protective tape 57 is bonded to the outermost circumferential part to form the wound electrode body 50. At last, for example, the wound electrode body 50 is tucked in the exterior member 60 and is sealed by bringing the outer peripheral parts of the exterior member 60 into tight contact with each other by thermal fusion bonding or the like. At this time, the adhesion film 61 is inserted between the cathode lead 51 and the anode lead 52 and the exterior member 60. This completes the non-aqueous electrolyte battery shown in FIGS. 7 and 8.

Furthermore, this non-aqueous electrolyte battery may be fabricated as follows. First, the cathode 53 and the anode 54 are fabricated in the above-described manner and the cathode lead 51 and the anode lead 52 are attached to the cathode 53 and the anode 54. Then, the cathode 53 and the anode 54 are stacked with the intermediary of the separator 58 and wound and the protective tape 57 is bonded to the outermost circumferential part to form the wound electrode body 50. Next, this wound electrode body 50 is sandwiched in the exterior member 60 and the outer peripheral parts except one side are thermally fusion-bonded to turn the exterior member 60 to a bag manner, so that the wound electrode body 50 is housed inside the exterior member 60. Subsequently, with the non-aqueous electrolyte solution, a composition for an electrolyte containing a monomer as a raw material of the polymer compound, a polymerization initiator, and, according to need, another material such as a polymerization inhibitor is prepared and they are injected to the inside of the exterior member 60.

After the composition for an electrolyte is injected, the opening part of the exterior member 60 is thermally fusion-bonded under a vacuum atmosphere to be sealed. Next, heat is applied to polymerize the monomer and turn it to the polymer compound to thereby form the gel electrolyte 56 in a gel manner, so that the non-aqueous electrolyte battery shown in FIGS. 7 and 8 is assembled.

Moreover, in the case of using a non-aqueous electrolyte solution instead of the gel electrolyte 56 in the non-aqueous electrolyte battery, the cathode 53 and the anode 54 are stacked with the intermediary of the separator 58 and wound and the protective tape 57 is bonded to the outermost circumferential part to form the wound electrode body 50. Next, this wound electrode body 50 is sandwiched in the exterior member 60 and the outer peripheral parts except one side are thermally fusion-bonded to turn the exterior member 60 to a bag manner, so that the wound electrode body 50 is housed inside the exterior member 60. Subsequently, the non-aqueous electrolyte solution is injected to the inside of the exterior member 60 and the opening part of the exterior member 60 is thermally fusion-bonded under a vacuum atmosphere to be sealed. Thereby, the non-aqueous electrolyte battery is assembled.

(Another Example of Non-Aqueous Electrolyte Battery of Laminate Film Type)

Figure 9:
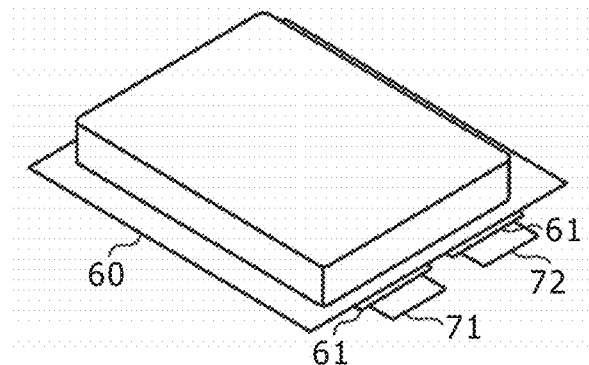
FIG. 9A is an appearance diagram of a non-aqueous electrolyte battery including a stacked electrode body housed in an exterior member.
FIG. 9B is an exploded perspective view showing how the stacked electrode body is housed in the exterior member.
FIG. 9C is an appearance diagram showing the appearance of the non-aqueous electrolyte battery shown in FIG. 9A from the bottom side.
Figure 9:
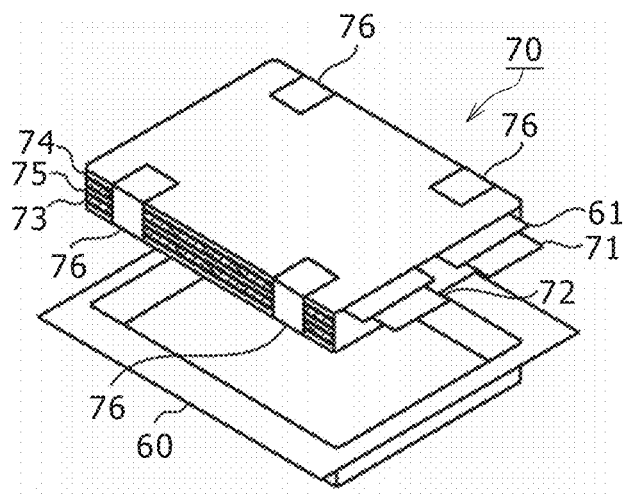
Figure 9:
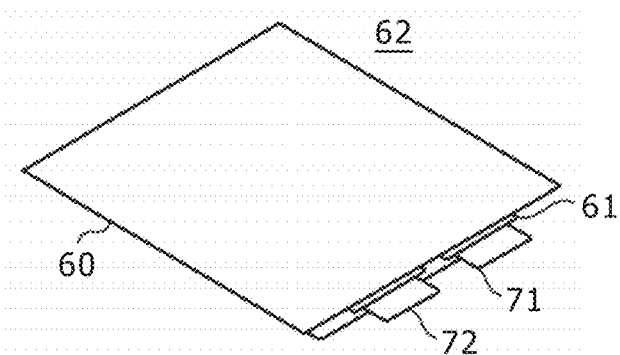

Although explanation is made about the non-aqueous electrolyte battery in which the wound electrode body 50 is wrapped by the exterior member 60 in the fourth embodiment of the present technique, a stacked electrode body 70 may be used instead of the wound electrode body 50 as shown in FIGS. 9A to 9C. FIG. 9A is an appearance diagram of a non-aqueous electrolyte battery in which the stacked electrode body 70 is housed. FIG. 9B is an exploded perspective view showing how the stacked electrode body 70 is housed in the exterior member 60. FIG. 9C is an appearance diagram showing the appearance of the non-aqueous electrolyte battery shown in FIG. 9A from the bottom side.

As the stacked electrode body 70, the stacked electrode body 70 in which a cathode 73 and an anode 74 of a rectangular shape are stacked with the intermediary of a separator 75 and are fixed by a fixing member 76 is used. A cathode lead 71 connected to the cathode 73 and an anode lead 72 connected to an anode 74 are led out from the stacked electrode body 70, and an adhesion film 61 is provided between the cathode lead 71 and the anode lead 72 and the exterior member 60. The separator 75 is the same as the first embodiment. The separator 75 is impregnated with a non-aqueous electrolyte solution. Furthermore, e.g. a gel electrolyte layer may be formed on the surfaces of the cathode 73 and the anode 74.

The above-described methods can be used as the forming method of the gel electrolyte, the pouring method of the non-aqueous electrolyte solution, and the thermal fusion bonding method of the exterior member 60.

5. Fifth Embodiment

Example of Battery Pack

Figure 10:
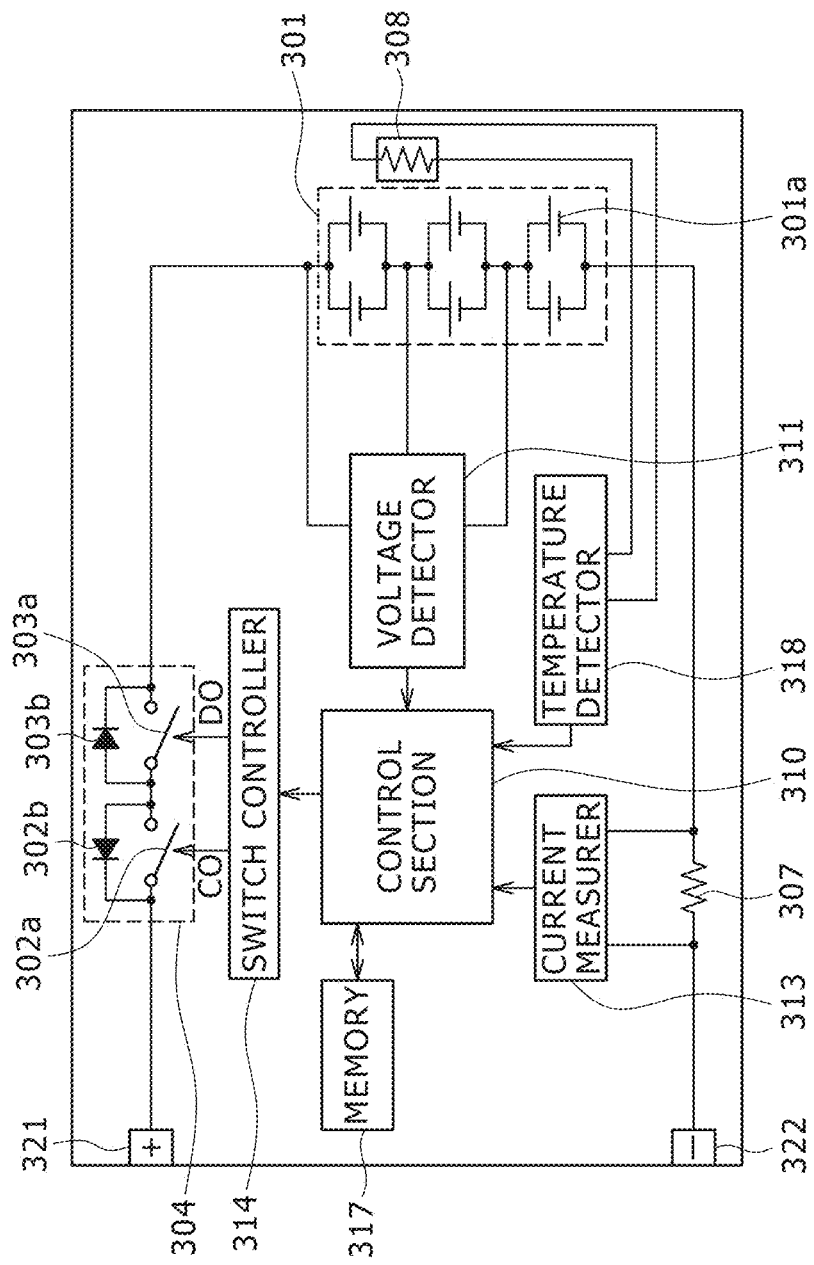
FIG. 10 is a block diagram showing a configuration example of a battery pack according to a fifth embodiment of the present technique.

FIG. 10 is a block diagram showing a circuit configuration example when the non-aqueous electrolyte batteries (hereinafter, referred to as secondary battery arbitrarily) according to the second to fourth embodiments of the present technique are applied to a battery pack. The battery pack includes an assembled battery 301, an exterior package, a switch section 304 including a charge control switch 302a and a discharge control switch 303a, a current detecting resistor 307, a temperature detecting element 308, and a control section 310.

Furthermore, the battery pack includes a cathode terminal 321 and an anode terminal 322. At the time of a charge, the cathode terminal 321 and the anode terminal 322 are connected to the cathode terminal and the anode terminal, respectively, of a charger, so that the charge is performed. Furthermore, when electronic apparatus is used, the cathode terminal 321 and the anode terminal 322 are connected to the cathode terminal and the anode terminal, respectively, of the electronic apparatus and a discharge is performed.

The assembled battery 301 is made by connecting plural secondary batteries 301a in series and/or in parallel. This secondary battery 301a is the secondary battery of the present technique. In FIG. 10, a case in which six secondary batteries 301a are connected with two batteries in parallel and three batteries in series (2P3S) is shown as an example. Besides, any connection method like n batteries in parallel and m batteries in series (n and m are integers) may be employed.

The switch section 304 includes the charge control switch 302a and a diode 302b and the discharge control switch 303a and a diode 303b and is controlled by the control section 310. The diode 302b has a polarity that is in the reverse direction for a charge current flowing in the direction from the cathode terminal 321 to the assembled battery 301 and is in the forward direction for a discharge current flowing in the direction from the anode terminal 322 to the assembled battery 301. The diode 303b has a polarity that is in the forward direction for the charge current and is in the reverse direction for the discharge current. Although the switch section 304 is provided on the positive side in the example, it may be provided on the negative side.

The charge control switch 302a is so controlled by a charge/discharge controller as to be turned OFF when the battery voltage has become an overcharge detection voltage so that the charge current may be prevented from flowing in the current path of the assembled battery 301. After the charge control switch 302a is turned OFF, only a discharge is allowed via the diode 302b. Furthermore, the charge control switch 302a is so controlled by the control section 310 as to be turned OFF when a large current flows at the time of a charge so that the charge current flowing in the current path of the assembled battery 301 may be blocked.

The discharge control switch 303a is so controlled by the control section 310 as to be turned OFF when the battery voltage has become an overdischarge detection voltage so that the discharge current may be prevented from flowing in the current path of the assembled battery 301. After the discharge control switch 303a is turned OFF, only a charge is allowed via the diode 303b. Furthermore, the discharge control switch 303a is so controlled by the control section 310 as to be turned OFF when a large current flows at the time of a discharge so that the discharge current flowing in the current path of the assembled battery 301 may be blocked.

The temperature detecting element 308 is e.g. a thermistor. It is provided near the assembled battery 301 and measures the temperature of the assembled battery 301 to supply the measured temperature to the control section 310. A voltage detector 311 measures the voltage of the assembled battery 301 and the respective secondary batteries 301a configuring it and performs A/D conversion of this measured voltage to supply the resulting voltage to the control section 310. A current measurer 313 measures the current by using the current detecting resistor 307 and supplies this measured current to the control section 310.

A switch controller 314 controls the charge control switch 302a and the discharge control switch 303a of the switch section 304 based on the voltage and the current input from the voltage detector 311 and the current measurer 313. The switch controller 314 prevents overcharge, overdischarge, and overcurrent charge/discharge by sending a control signal to the switch section 304 when the voltage of any of the secondary batteries 301a has become the overcharge detection voltage or the overdischarge detection voltage or lower or when a large current suddenly flows.

Here, for example, if the secondary battery is a lithium ion secondary battery, the overcharge detection voltage is defined as e.g. 4.20 V+/−0.05 V and the overdischarge detection voltage is defined as e.g. 2.4 V+/−0.1 V.

As the charge and discharge switches, e.g. a semiconductor switch such as a MOSFET can be used. In this case, the parasitic diode of the MOSFET functions as the diodes 302b and 303b. If P-channel FETs are used as the charge and discharge switches, the switch controller 314 supplies control signals DO and CO to the respective gates of the charge control switch 302a and the discharge control switch 303a, respectively. If the charge control switch 302a and the discharge control switch 303a are the P-channel type, they are turned ON by a gate potential lower than the source potential by a predetermined value or larger. That is, in normal charge and discharge operation, the control signals CO and DO are set to the low level to set the charge control switch 302a and the discharge control switch 303a to the ON-state.

Furthermore, for example in an overcharge or an overdischarge, the control signals CO and DO are set to the high level to set the charge control switch 302a and the discharge control switch 303a to the OFF-state.

A memory 317 is formed of a RAM or a ROM and is formed of e.g. an EPROM (Erasable Programmable Read Only Memory), which is a non-volatile memory, or the like. In the memory 317, numerical values calculated by the control section 310, the internal resistance value of the battery in the initial state of each secondary battery 301a measured at the stage of the manufacturing step, and so forth are stored in advance. Furthermore, arbitrary rewriting is also possible. Moreover, by making the memory 317 store the full charge capacity of the secondary battery 301a, e.g. the remaining capacity can be calculated with the control section 310.

In a temperature detector 318, the temperature is measured by using the temperature detecting element 308 to carry out charge/discharge control at the time of unusual heat generation and carry out correction in calculation of the remaining battery.

6. Sixth Embodiment

The above-described batteries according to the second to fourth embodiments of the present technique and the battery pack according to the fifth embodiment using it can be mounted in apparatus such as electronic apparatus, electric vehicle, and electric storage device or be used to supply power to the apparatus.

Examples of the electronic apparatus include notebook personal computer, PDA (portable information terminal), cell-phone, cordless phone handset, video movie, digital still camera, electronic book, electronic dictionary, music player, radio, headphone, game machine, navigation system, memory card, pacemaker, hearing aid, electric tool, electric shaver, refrigerator, air conditioner, television, stereo, water heater, microwave, dishwasher, washing machine, drying machine, lighting equipment, toy, medical instrument, robot, load conditioner, traffic light, etc.

Furthermore, as the electric vehicle, railroad vehicle, golf cart, electric cart, electric car (including hybrid car), etc. are cited, and the battery and the battery pack are used as a driving power supply or an auxiliary power supply of them.

As the electric storage device, a power supply for power storage for buildings typified by houses or for electric generating facilities and so forth are cited.

In the following, a specific example of an electric storage system using an electric storage device to which the above-described non-aqueous electrolyte battery of the present technique is applied, among the above-described application examples, will be described.

As this electric storage system, e.g. the following configurations are cited. A first electric storage system is an electric storage system in which an electric storage device is charged by electric generating equipment that performs electric generation from renewable energy. A second electric storage system is an electric storage system that has an electric storage device and supplies power to electronic apparatus connected to the electric storage device. A third electric storage system is electronic apparatus that receives supply of power from an electric storage device. These electric storage systems are implemented as a system that intends efficient supply of power in cooperation with an external power supply network.

Moreover, a fourth electric storage system is an electric vehicle having a conversion unit that receives supply of power from an electric storage device to convert it to driving force of the vehicle and a control unit that executes information processing relating to vehicle control based on information relating to the electric storage device. A fifth electric storage system is a power system that includes a power information transmitter/receiver to transmit/receive a signal to/from another piece of apparatus via a network and carries out charge/discharge control of the above-described electric storage device based on information received by the transmitter/receiver. A sixth electric storage system is a power system that receives supply of power from the above-described electric storage device or supplies power to the electric storage device from electric generating equipment or a power network. The electric storage system will be described below.

(6-1) Electric Storage System in House as Application Example

Figure 11:
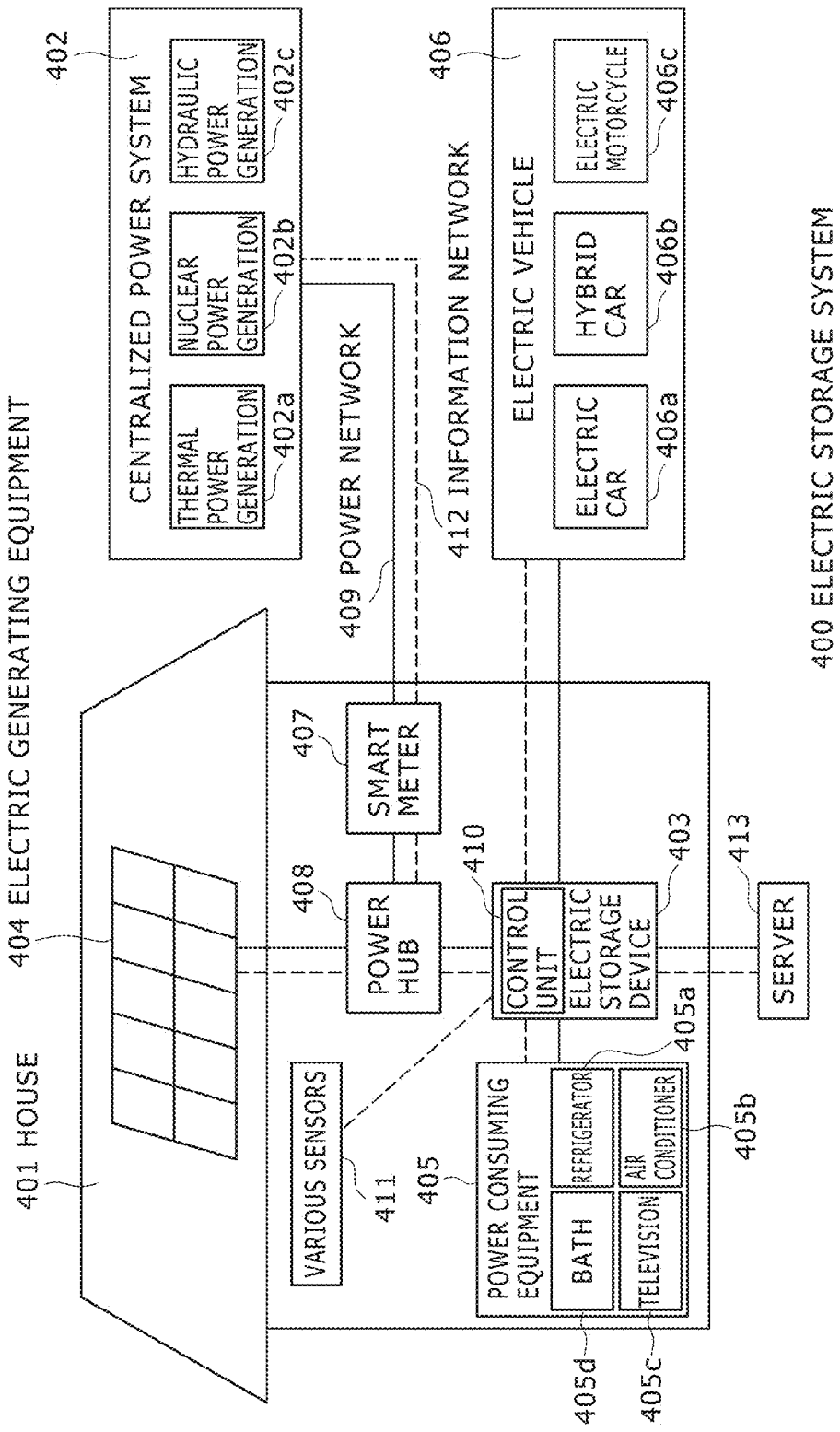
FIG. 11 is a schematic diagram showing an example of application to an electric storage system for a house using the non-aqueous electrolyte battery of the present technique.

An example in which an electric storage device using the battery of the present technique is applied to an electric storage system for a house will be described with reference to FIG. 11. For example, in an electric storage system 400 for a house 401, power is supplied to an electric storage device 403 from a centralized power system 402 of thermal power generation 402a, nuclear power generation 402b, hydraulic power generation 402c, etc. via a power network 409, an information network 412, a smart meter 407, a power hub 408, etc. With this, power is supplied from an independent power supply such as electric generating equipment 404 in the home to the electric storage device 403. The power supplied to the electric storage device 403 is stored. Power to be used in the house 401 is fed by using the electric storage device 403. A similar electric storage system can be used not only in the house 401 but also regarding a building.

In the house 401, the electric generating equipment 404, a power consuming equipment 405, the electric storage device 403, a control unit 410 that controls the respective pieces of equipment, the smart meter 407, and sensors 411 that acquire various kinds of information are provided. The respective pieces of equipment are connected by the power network 409 and the information network 412. A solar battery, a fuel battery, etc. are utilized as the electric generating equipment 404 and generated power is supplied to the power consuming equipment 405 and/or the electric storage device 403. The power consuming equipment 405 is a refrigerator 405a, an air conditioner 405b, a television receiver 405c, a bath 405d, etc. Moreover, electric vehicles 406 are included in the power consuming equipment 405. The electric vehicles 406 are an electric car 406a, a hybrid car 406b, and an electric motorcycle 406c.

The battery of the present technique is applied to the electric storage device 403. The battery of the present technique may be configured by e.g. the above-described lithium ion secondary battery. The smart meter 407 has a function to measure the use amount of commercial power and transmit the measured use amount to a power company. In the power network 409, any one or plurality of DC (direct current) power feed, AC (alternating current) power feed, and non-contact power feed may be combined.

The various sensors 411 are e.g. motion sensor, illuminance sensor, object detecting sensor, power consumption sensor, vibration sensor, contact sensor, temperature sensor, infrared sensor, etc. Information acquired by the various sensors 411 is transmitted to the control unit 410. The weather state, the human state, and so forth are grasped based on the information from the sensors 411 and the power consuming equipment 405 is automatically controlled to allow minimization of the energy consumption. Moreover, the control unit 410 can transmit information relating to the house 401 to an external power company or the like via the Internet.

Branching of the power line and processing of DC-AC conversion and so forth are carried out by the power hub 408. As the communication system of the information network 412 connected to the control unit 410, there are a method of using a communication interface such as the UART (Universal Asynchronous Receiver-Transceiver: transmitting/receiving circuit for asynchronous serial communication) and a method of utilizing a sensor network based on a wireless communication standard such as Bluetooth, ZigBee, or Wi-Fi. The Bluetooth system is applied to multimedia communication and allows communication of a one-to-many connection. The ZigBee is a standard using a physical layer of IEEE (Institute of Electrical and Electronics Engineers) 802.15.4. The IEEE 802.15.4 is the name of a short-range wireless network standard called PAN (Personal Area Network) or W (Wireless) PAN.

The control unit 410 is connected to an external server 413. This server 413 may be managed by any of the house 401, a power company, and a service provider. Information transmitted and received by the server 413 is e.g. power consumption information, life pattern information, power bill, weather information, natural disaster information, and information relating to power trading. These pieces of information may be transmitted and received from power consuming equipment in the home (e.g. television receiver) and may be transmitted and received from equipment outside the home (e.g. cell-phone or the like). These pieces of information may be displayed on apparatus having a display function, such as television receiver, cell-phone, and PDA (Personal Digital Assistants).

The control unit 410 that controls the respective sections is configured by CPU (Central Processing Unit), RAM (Random Access Memory), ROM (Read Only Memory), and so forth and is stored in the electric storage device 403 in this example. The control unit 410 is connected to the electric storage device 403, the electric generating equipment 404 in the home, the power consuming equipment 405, the various sensors 411, and the server 413 by the information network 412 and has e.g. a function to adjust the use amount and electric generation amount of commercial power. Besides, it may have a function to carry out power trading in a power market and so forth.

As described above, not only power by the centralized power system 402 of the thermal power generation 402a, the nuclear power generation 402b, the hydraulic power generation 402c, etc. but also generated power of the electric generating equipment 404 (solar power generation, wind power generation) in the home can be stored in the electric storage device 403. Therefore, even if the generated power of the electric generating equipment 404 in the home varies, control of making the amount of power sent out to the external constant or discharging power by the necessary amount can be carried out. For example, the following usage is also possible. Power obtained by solar power generation is stored in the electric storage device 403 and low-cost late-night power is stored in the electric storage device 403 in the night. Furthermore, the power stored by the electric storage device 403 is discharged and utilized in a high-cost time zone in the daytime.

Although the example in which the control unit 410 is stored in the electric storage device 403 is described in this example, it may be stored in the smart meter 407 and may be configured alone. Moreover, the electric storage system 400 may be used for plural homes in collective housing and may be used for plural single-family houses.

(6-2) Electric Storage System in Vehicle as Application Example

Figure 12:
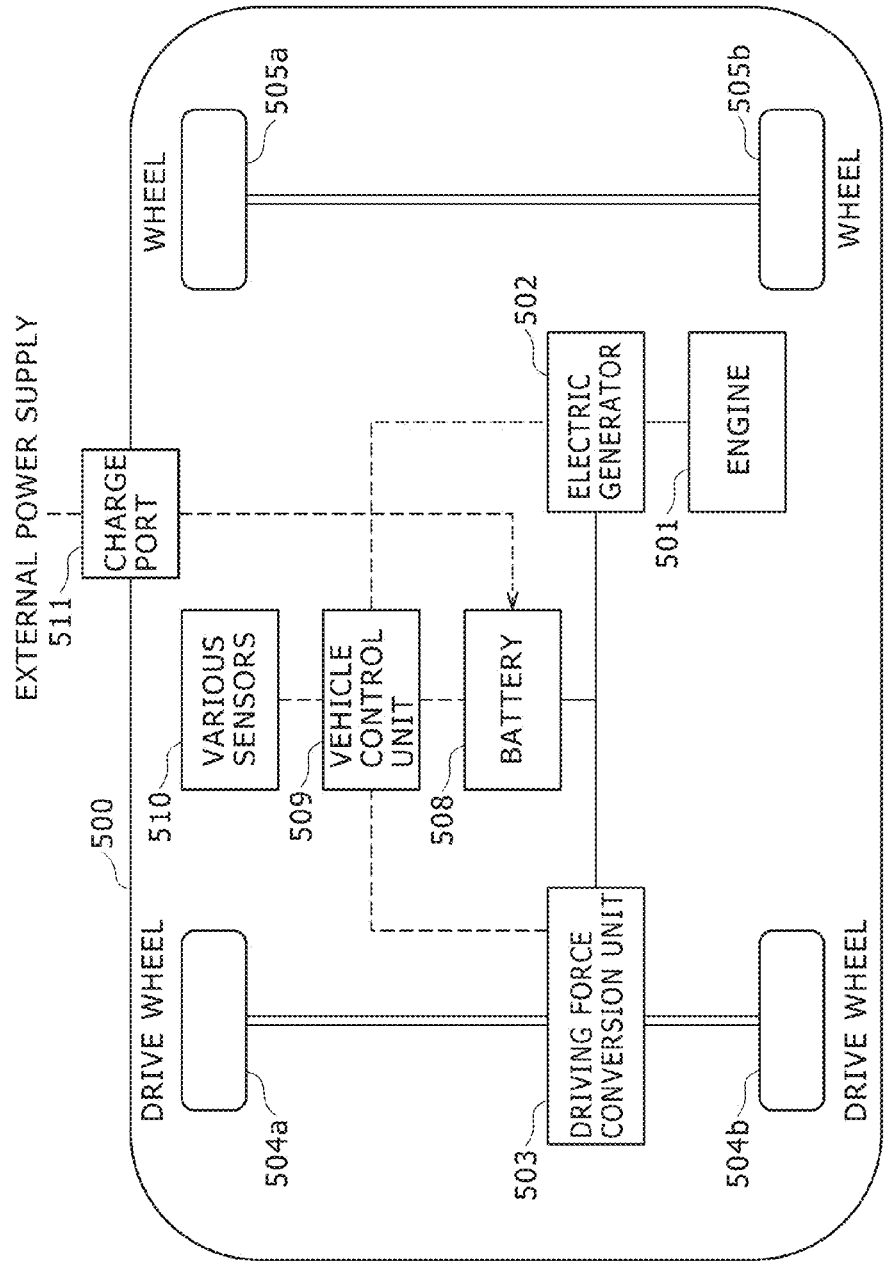
FIG. 12 is a schematic diagram schematically showing one example of the configuration of a hybrid vehicle employing a series hybrid system to which the present technique is applied.

An example in which the present technique is applied to an electric storage system for a vehicle will be described with reference to FIG. 12. In FIG. 12, one example of the configuration of a hybrid vehicle employing a series hybrid system to which the present technique is applied is schematically shown. The series hybrid system is a car that runs by a power-driving force conversion unit by using power generated by an electric generator activated by an engine or power obtained by temporarily storing it in a battery.

In this hybrid vehicle 500, an engine 501, an electric generator 502, a power-driving force conversion unit 503, a drive wheel 504a, a drive wheel 504b, a wheel 505a, a wheel 505b, a battery 508, a vehicle control unit 509, various sensors 510, and a charge port 511 are mounted. To the battery 508, the above-described non-aqueous electrolyte battery of the present technique is applied.

The hybrid vehicle 500 runs by being powered by the power-driving force conversion unit 503. One example of the power-driving force conversion unit 503 is a motor. The power-driving force conversion unit 503 operates by power of the battery 508 and the rotational force of this power-driving force conversion unit 503 is transmitted to the drive wheels 504a and 504b. By using direct current-alternating current (DC-AC) or reverse conversion (AC-DC conversion) for the necessary place, the power-driving force conversion unit 503 can be applied whether it is an AC motor or a DC motor. The various sensors 510 control the engine rotational speed via the vehicle control unit 509 and control the opening degree of a throttle valve that is not shown in the diagram (throttle opening). In the various sensors 510, velocity sensor, acceleration sensor, engine rotational speed sensor, etc. are included.

The rotational force of the engine 501 is transmitted to the electric generator 502 and power generated by the electric generator 502 by the rotational force can be stored in the battery 508.

When the hybrid vehicle 500 decelerates by a braking mechanism that is not shown in the diagram, resistance force at the time of the deceleration is applied to the power-driving force conversion unit 503 as rotational force, and regenerative power generated by the power-driving force conversion unit 503 by this rotational force is accumulated in the battery 508.

It is also possible that the battery 508 is connected to a power supply outside the hybrid vehicle 500 to thereby receive power supply from the external power supply by using the charge port 511 as an input port and accumulate the received power.

Although not shown in the diagram, the hybrid vehicle 500 may include an information processing device that executes information processing relating to vehicle control based on information relating to the secondary battery. As such an information processing device, there is e.g. an information processing device that performs displaying of the battery remaining capacity based on information relating to the remaining capacity of the battery, or the like.

In the above, a series hybrid car that runs by a motor by using power generated by the electric generator activated by the engine or power obtained by temporarily storing it in the battery is described as an example. However, the present technique can be effectively applied also to a parallel hybrid car that employs both outputs of engine and motor as the drive source and uses, with arbitrary switching, three systems, running by only the engine, running by only the motor, and running by the engine and the motor. Moreover, the present technique can be effectively applied also to a so-called electric vehicle that does not use an engine and runs by driving by only a drive motor.

WORKING EXAMPLES

The present technique will be described below in detail by working examples. The configuration of the present technique is not limited to the following working examples.

Working Example 1-1

Fabrication of Separator (Preparation of Resin Solution)

First, alumina particles with an average particle size of 0.5 μm as inorganic particles, collapsible particles H122 (silica secondary particles made by AGC SI-Tech. Co., Ltd.) with an average particle size of 10 μm, and polyvinylidene fluoride as a resin material were mixed and dispersed in N-methyl-2-pyrrolidinone to prepare a resin solution. In the preparation of the resin solution, the volume ratio between the alumina particles and the collapsible particles H122 (alumina: H122) was adjusted to 80:20, and the volume ratio between the particles (alumina particles and collapsible particles H122) and the polyvinylidene fluoride (particles: polyvinylidene fluoride) was adjusted to 80:20. The volume ratio of the particles was calculated with the true specific gravity of the respective materials. However, as for the collapsible particles, the calculation was performed from the specific gravity of the particle itself, worked out from the pore volume and the true specific gravity of the material. In the case of the collapsible particles H122, the pore volume is 1.63 ml/g and therefore the specific gravity of the particle itself is 0.48 g/ml.

(Forming of Surface Layer)

A polyethylene (PE) porous membrane with a thickness of 12 μm was used as a substrate. The above-described resin solution was applied on one surface (single surface) of this substrate with the application amount adjusted to obtain 3.0 μm as the film thickness of the second region. Then, the substrate was immersed in a coagulating liquid composed of water and thereafter dried to form a porous surface layer. In the surface layer, the first regions configured by the first particles (collapsible particles H122) and the second region including the second particles (alumina particles) and the resin material (polyvinylidene fluoride) were formed. In the surface layer, the first regions were dotted about the second region. By the above, a separator of working example 1-1 was fabricated.

Working Example 1-2

A separator was fabricated similarly to working example 1-1 except for that collapsible particles H52 (silica secondary particles made by AGC SI-Tech. Co., Ltd.) with an average particle size of 8 μm were used instead of the collapsible particles H122 (silica secondary particles made by AGC SI-Tech. Co., Ltd.) with an average particle size of 10 μm. The specific gravity of the particle itself of the collapsible particles H52 is 0.45 g/ml.

Working Example 1-3

A separator was fabricated similarly to working example 1-1 except for that collapsible particles H33 (silica secondary particles made by AGC SI-Tech. Co., Ltd.) with an average particle size of 5 μm were used instead of the collapsible particles H122 (silica secondary particles made by AGC SI-Tech. Co., Ltd.) with an average particle size of 10 μm. The specific gravity of the particle itself of the collapsible particles H33 is 0.48 g/ml.

Working Example 1-4

A separator was fabricated similarly to working example 1-3 except for that the resin solution was applied on both surfaces (double surfaces) of the substrate to form a surface layer on the double surfaces of the substrate. The application amount of the resin solution per single surface was set the same as that of working example 1-3.

Working Example 1-5

A separator was fabricated similarly to working example 1-3 except for that the volume ratio between the alumina particles and the collapsible particles H33 (alumina particles:collapsible particles H33) was changed to 70:30 in the preparation of the resin solution.

Working Example 1-6

A separator was fabricated similarly to working example 1-3 except for that the volume ratio between the alumina particles and the collapsible particles H33 (alumina particles:collapsible particles H33) was changed to 60:40 in the preparation of the resin solution.

Working Example 1-7

A separator was fabricated similarly to working example 1-3 except for that the volume ratio between the alumina particles and the collapsible particles H33 (alumina particles:collapsible particles H33) was changed to 50:50 in the preparation of the resin solution.

Working Example 1-8

A separator was fabricated similarly to working example 1-3 except for that the volume ratio between the alumina particles and the collapsible particles H33 (alumina particles:collapsible particles H33) was changed to 40:60 in the preparation of the resin solution.

Working Example 1-9

A separator was fabricated similarly to working example 1-3 except for that the volume ratio between the alumina particles and the collapsible particles H33 (alumina particles:collapsible particles H33) was changed to 30:70 in the preparation of the resin solution.

Working Example 1-10

A separator was fabricated similarly to working example 1-3 except for that the volume ratio between the alumina particles and the collapsible particles H33 (alumina particles:collapsible particles H33) was changed to 20:80 in the preparation of the resin solution.

Working Example 1-11

A separator was fabricated similarly to working example 1-3 except for that the volume ratio between the alumina particles and the collapsible particles H33 (alumina particles:collapsible particles H33) was changed to 10:90 in the preparation of the resin solution.

Working Example 1-12

A separator was fabricated similarly to working example 1-3 except for that the volume ratio between the alumina particles and the collapsible particles H33 (alumina particles:collapsible particles H33) was changed to 5:95 in the preparation of the resin solution.

Comparative Example 1-1

Without forming a surface layer, a substrate (polyethylene (PE) porous membrane with a thickness of 12 μm) was employed as a separator of comparative example 1-1.

Comparative Example 1-2

A separator was fabricated similarly to working example 1-1 except for that only the collapsible particles H122 were used without using the alumina particles in the preparation of the resin solution.

Comparative Example 1-3

A separator was fabricated similarly to working example 1-2 except for that only the collapsible particles H52 were used without using the alumina particles in the preparation of the resin solution.

Comparative Example 1-4

A separator was fabricated similarly to working example 1-3 except for that only the collapsible particles H33 were used without using the alumina particles in the preparation of the resin solution.

Comparative Example 1-5

A separator was fabricated similarly to comparative example 1-4 except for that the resin solution was applied on both surfaces of the substrate. The application amount of the resin solution per single surface was the same as that of comparative example 1-4.

Comparative Example 1-6

A separator was fabricated similarly to working example 1-1 except for that only the alumina particles were used without using the collapsible particles H122 in the preparation of the resin solution.

Comparative Example 1-7

A separator was fabricated similarly to working example 1-1 except for that boehmite particles with an average particle size of 6 μm were used instead of the collapsible particles H122 in the preparation of the resin solution.

Comparative Example 1-8

A separator was fabricated similarly to comparative example 1-7 except for that the resin solution was applied on both surfaces of the substrate. The application amount of the resin solution per single surface was the same as that of comparative example 1-7.

Comparative Example 1-9

A separator was fabricated similarly to working example 1-1 except for that boehmite particles with an average particle size of 9.5 μm were used instead of the collapsible particles H122 in the preparation of the resin solution.

Comparative Example 1-10

A separator was fabricated similarly to comparative example 1-9 except for that the resin solution was applied on both surfaces of the substrate. The application amount of the resin solution per single surface was the same as that of comparative example 1-9.

Comparative Example 1-11

Preparation of Resin Solution

First, alumina particles with an average particle size of 0.5 μm as inorganic particles, silica particles (R812 made by Nippon Aerosil Co., Ltd.) with an average particle size of 7 nm, and polyvinylidene fluoride as a resin material were mixed and dispersed in N-methyl-2-pyrrolidone to prepare a resin solution. In the preparation of the resin solution, the volume ratio between the alumina particles and the silica particles (alumina:silica particles) was adjusted to 80:20, and the volume ratio between the particles (alumina particles and silica particles) and the polyvinylidene fluoride (particles:polyvinylidene fluoride) was adjusted to 80:20. The volume ratio of the particles was calculated with the true specific gravity of the respective materials.

(Forming of Surface Layer)

A polyethylene (PE) porous membrane with a thickness of 12 μm was used as a substrate. The above-described resin solution was applied on one surface (single surface) of this substrate with the application amount adjusted to obtain 3.0 μm as the film thickness of the second region. Then, the substrate was immersed in a coagulating liquid composed of water and thereafter dried to form a porous surface layer. By the above, a separator of comparative example 1-11 was fabricated.

(SEM Observation)

To check the states of the surface layer before press and after press, observation of the surface layer before press and after press by a SEM (Scanning Electron Microscope) was performed.

(Surface Observation)

First, surface observation for checking the collapsibility of the collapsible particles was performed. In this surface observation, it is difficult to check the collapsibility of the collapsible particles if the surfaces of the collapsible particles are covered by the second particles (alumina particles). Therefore, the separator of comparative example 1-2, in which the surfaces of the collapsible particles were not covered by the second particles (alumina particles), was chosen as the sample with which the SEM observation was performed.

One piece of the separator was sandwiched by heavy paper sheets and the separator was pressed at a pressure of 100 kg/cm$^2$ by using a hand press machine. Electron microscope observation was performed about the states of the surface layer before the press and after the press by using a scanning electron microscope S4800 made by Hitachi High-Technologies Corporation.

Figure 13:
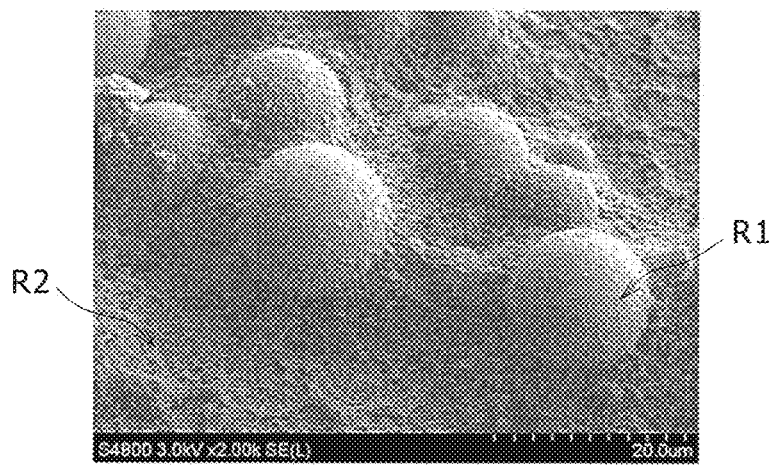
FIG. 13A is a SEM image of the surface layer before press.
FIG. 13B is a SEM image of the surface layer after the press.
Figure 13:
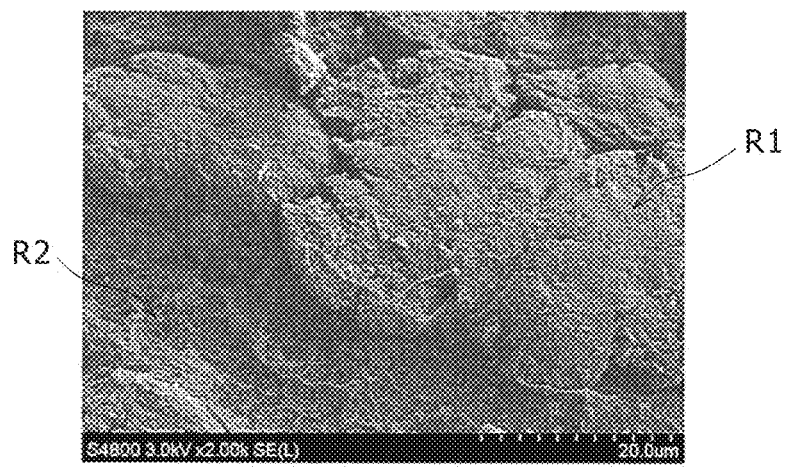

In FIG. 13A, a SEM image of the surface layer before the press in the separator of comparative example 1-2 is shown. In FIG. 13B, a SEM image of the surface layer after the press in the separator of comparative example 1-2 is shown. As shown in FIGS. 13A and 13B, the state in which the collapsible particles H122 before the press collapsed to be crushed after the press was confirmed.

(Section Observation)

Section observation of the separator for checking the state of the surface layer after the press was performed. The separator of working example 1-1 was chosen as the sample with which the SEM observation was performed. One piece of this separator was sandwiched between heavy paper sheets and the separator was pressed at a pressure of 100 kg/cm$^2$ by using a hand press machine. Electron microscope observation was performed about the section of the separator after the press by using a scanning electron microscope S4800 made by Hitachi High-Technologies Corporation.

Figure 14:
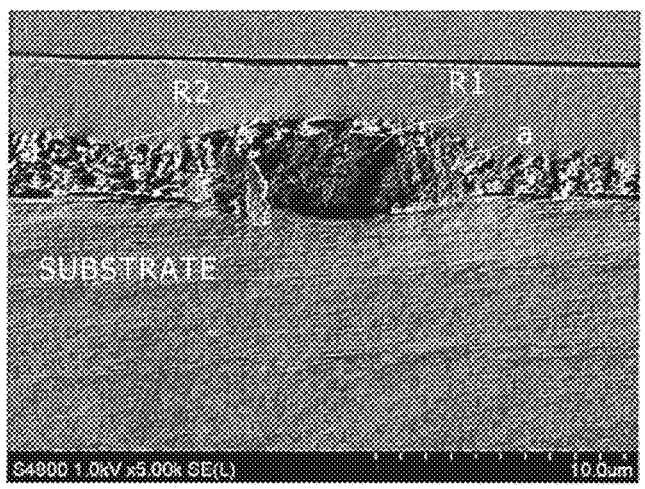
FIG. 14A shows a SEM image of a section of a separator of working example 1-1 after press.
FIG. 14B is a SEM image obtained by enlarging part indicated by arrow a in FIG. 14A.
FIG. 14C is a SEM image obtained by enlarging part indicated by arrow b in FIG. 14B.
Figure 14:
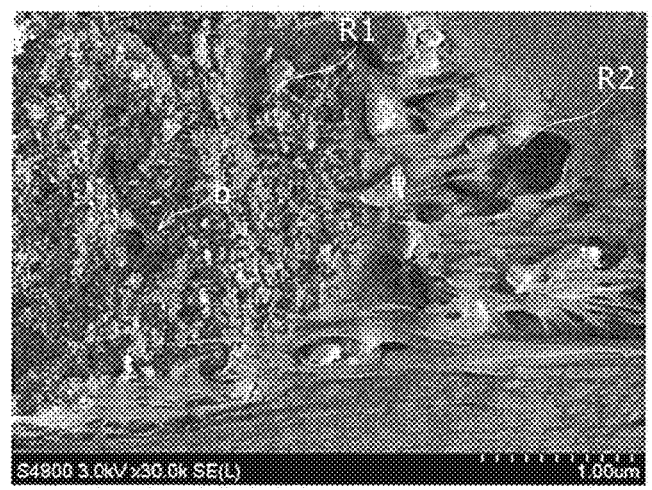
Figure 14:
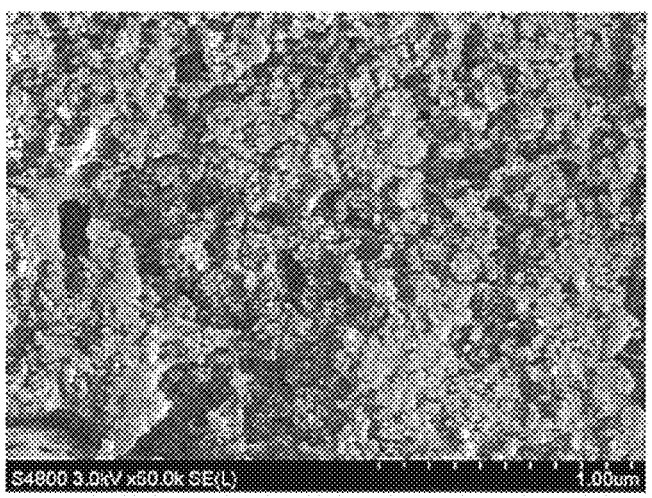

FIG. 14A shows a SEM image of a section of the separator of working example 1-1 after the press. FIG. 14B is a SEM image obtained by enlarging the part indicated by arrow a in FIG. 14A. FIG. 14C is a SEM image obtained by enlarging the part indicated by arrow b in FIG. 14B.

As shown in FIGS. 14A to 14C, the first particle (collapsible particle H122) as the secondary particle collapsed and was crushed after the press. Also after the press, the first region R1 configured by the first particle (collapsible particle H122) as the secondary particle and the second region R2 configured by the second particles (alumina particles) and the resin material (polyvinylidene fluoride) were maintained.

(SEM Observation and Elemental Mapping by EDX for Surface Layer after Press)

SEM observation and elemental mapping by EDX for the surface layer after the press were performed. As the samples to be observed, the separator of working example 1-1 and the separator of comparative example 1-11 were chosen.

One piece of the separator was sandwiched by heavy paper sheets and the separator was pressed at a pressure of 100 kg/cm$^2$ by using a hand press machine. Electron microscope observation and elemental mapping by EDX (Energy Dispersive X-ray Spectroscopy) were performed about the states of the surface layer before the press and after the press by using a scanning electron microscope S4800 made by Hitachi High-Technologies Corporation.

Figure 15:
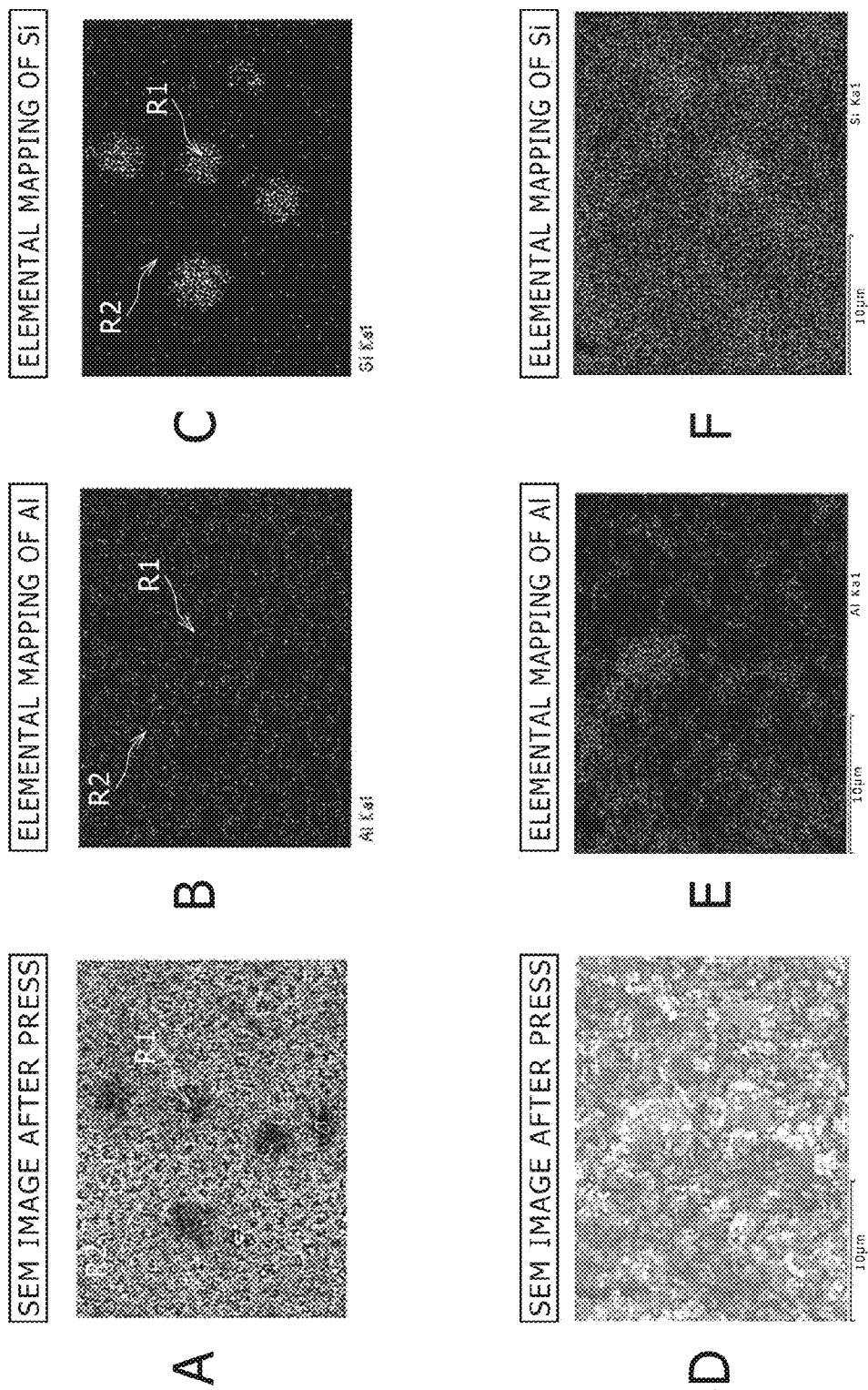
FIG. 15A is a SEM image of the surface layer after the press in the separator of working example 1-1.
FIG. 15B is an elemental mapping image of the surface layer after the press in the separator of working example 1-1.
FIG. 15C is an elemental mapping image of the surface layer after the press in the separator of working example 1-1.
FIG. 15D is a SEM image of the surface layer after the press in the separator of comparative example 1-11.
FIG. 15E is an elemental mapping image of the surface layer after the press in the separator of comparative example 1-11.
FIG. 15F is an elemental mapping image of the surface layer after the press in the separator of comparative example 1-11.

FIG. 15A is a SEM image of the surface layer after the press in the separator of working example 1-1. FIG. 15B is an elemental mapping image of the surface layer after the press in the separator of working example 1-1. FIG. 15C is an elemental mapping image of the surface layer after the press in the separator of working example 1-1. FIG. 15D is a SEM image of the surface layer after the press in the separator of comparative example 1-11. FIG. 15E is an elemental mapping image of the surface layer after the press in the separator of comparative example 1-11. FIG. 15F is an elemental mapping image of the surface layer after the press in the separator of comparative example 1-11.

As shown in FIG. 15A, it could be confirmed by the SEM observation that, after the press of the separator, although the first particles (collapsible particles H122) collapsed, the first regions R1 configured by the first particles (collapsible particles H122) and the second region R2 configured by the second particles (alumina) and the resin material (polyvinylidene fluoride) were maintained. Furthermore, as shown in FIGS. 15B and 15C, the first regions R1 and the second region R2 were confirmed from the elemental mapping image of the constituent element (Si) of the first particles and the elemental mapping image of the constituent element (Al) of the second particles. Specifically, in FIG. 15B, the regions where Al does not densely exist indicate R1 and the region where Al evenly exists indicates R2. In FIG. 15C, the regions where Si densely exists indicate R1 and the region where Si does not densely exist indicates R2. On the other hand, as shown in FIGS. 15D to 15F, in the surface layer formed by application of the coating material containing the mixture of alumina and nano-silica particles, the state in which the first regions were dotted about the second region like working example 1-1 was not confirmed although possibly segregation occurred.

(Evaluation)

The following "confirmation of collapsibility of particles," "measurement of compression rate of surface layer," and "evaluation of peeling resistance" were performed about working example 1-1 to working example 1-12 and comparative example 1-1 to comparative example 1-10.

(Confirmation of Collapsibility of Particles)

One piece of the separator was sandwiched by heavy paper sheets and the separator was pressed at a pressure of 100 kg/cm$^2$ by using a hand press machine. Electron microscope observation was performed about the states of the surface layer before the press and after the press by using a scanning electron microscope S4800 made by Hitachi High-Technologies Corporation. The separator with which the state in which the particles collapsed and were crushed could be confirmed after the press was defined as that the collapsibility was present. The separator in which the particles did not collapse and were not crushed after the press was defined as that the collapsibility was absent.

(Measurement of Compression Rate of Surface Layer)

The compression rate of the surface layer was obtained as follows. First, the film thickness of the surface layer before the press was obtained. The film thickness of the surface layer before the press was obtained as follows.

First, the film thickness of the surface layer per single surface, obtained by subtracting the thickness of the substrate (12 μm) from the thickness when a load of 1.8 kg/cm² was applied to the separator by using a circular flat indenter with a diameter of 6 mm, was measured. Moreover, the above measurement was repeated at 10 points and the average value was calculated, so that the average value was obtained as the film thickness of the surface layer.

Next, one piece of the separator was sandwiched by heavy paper sheets and the separator was pressed at a pressure of 100 kg/cm² by using a hand press machine. Next, the film thickness of the surface layer of the separator after the press was obtained similarly to the above.

Next, the thickness of the crushed surface layer was calculated from the difference in the film thickness of the surface layer between before the press and after the press. Next, by substituting "thickness of crushed surface layer" and "film thickness of surface layer before press" obtained in the above-described manner into the following equation, the compression rate of the surface layer was obtained.

Surface layer compression rate (%)=(Thickness of crushed surface layer/Film thickness of surface layer before press)*100(%)

(Evaluation of Peeling Resistance)

Evaluation of the peeling resistance was performed by performing electron microscope observation of the surface layer of the separator by using a scanning electron microscope S4800 made by Hitachi High-Technologies Corporation.

Figure 16:
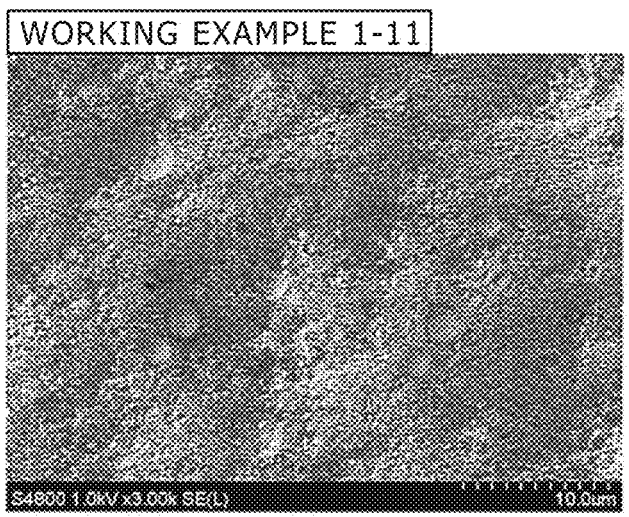
FIG. 16A is a SEM image of the state in which the first particles of the surface layer of working example 1-11 are not peeled.
FIG. 16B is a SEM image of a place where peeling of the first particles of working example 1-12 occurred.
Figure 16:
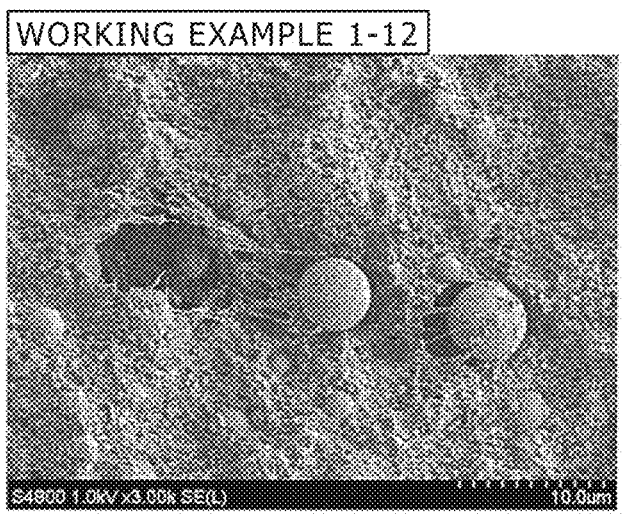

Specifically, about the surface layer, SEM observation of a predetermined range (250 μm*100 μm) was performed at 10 places randomly and the oxidation resistance was evaluated based on the following criteria.

in the case in which peeling of the particle forming the first region could not be found
A
in the case in which peeling of the particle forming the first region could be found at one to three places
B
in the case in which peeling of the particle forming the first region could be found at four or more places.
C In FIG. 16A, a SEM image of the state in which the first particles of the surface layer of working example 1-11 are not peeled is shown. In FIG. 16B, a SEM image of a place where peeling of the first particles of working example 1-12 occurred is shown.

The evaluation results of working example 1-1 to working example 1-12 and comparative example 1-1 to comparative example 1-10 are shown in Table 1.

TABLE 1

| | Substrate | Coated Surface | Particle | | | Film Thickness (μm) | | Film Thickness (μm) after 100-kg/cm²-press | | Surface Layer | |
|---|---|---|---|---|---|---|---|---|---|---|---|
| | Thickness (μm) | | Kind | Ratio (vol %) | Collapsibility of Particle | Separator | Surface Layer | Separator | Surface Layer | Compression Rate (%) | Peeling Resistance |
| Working Example 1-1 | 12 | Single Surface | Alumina/H122 | 80/20 | Present | 22 | 10 | 15 | 3 | 70 | A |
| Working Example 1-2 | | Single Surface | Alumina/H52 | 80/20 | Present | 20 | 8 | 15 | 3 | 63 | A |
| Working Example 1-3 | | Single Surface | Alumina/H33 | 80/20 | Present | 17 | 5 | 15 | 3 | 40 | A |
| Working Example 1-4 | | Double Surfaces | Alumina/H33 | 80/20 | Present | 22 | 5* | 18 | 3* | 40 | A |
| Working Example 1-5 | | Single Surface | Alumina/H33 | 70/30 | Present | 17 | 5 | 15 | 3 | 40 | A |
| Working Example 1-6 | | Single Surface | Alumina/H33 | 60/40 | Present | 17 | 5 | 15 | 3 | 40 | A |
| Working Example 1-7 | | Single Surface | Alumina/H33 | 50/50 | Present | 17 | 5 | 15 | 3 | 40 | A |
| Working Example 1-8 | | Single Surface | Alumina/H33 | 40/60 | Present | 17 | 5 | 15 | 3 | 40 | A |
| Working Example 1-9 | | Single Surface | Alumina/H33 | 30/70 | Present | 17 | 5 | 15 | 3 | 40 | A |
| Working Example 1-10 | | Single Surface | Alumina/H33 | 20/80 | Present | 17 | 5 | 15 | 3 | 40 | A |
| Working Example 1-11 | | Single Surface | Alumina/H33 | 10/90 | Present | 17 | 5 | 15 | 3 | 40 | A |
| Working Example 1-12 | | Single Surface | Alumina/H33 | 5/95 | Present | 17 | 5 | 15 | 3 | 40 | B |
| Comparative Example 1-1 | 12 | — | — | — | — | 12 | — | 12 | — | — | — |
| Comparative Example 1-2 | | Single Surface | H122 | 100 | Present | 26 | 14 | 15 | 3 | 79 | C |
| Comparative Example 1-3 | | Single Surface | H52 | 100 | Present | 21 | 9 | 16 | 4 | 56 | C |
| Comparative Example 1-4 | | Single Surface | H33 | 100 | Present | 17 | 5 | 15 | 3 | 40 | C |
| Comparative Example 1-5 | | Double Surfaces | H33 | 100 | Present | 22 | 5* | 18 | 3* | 40 | C |

TABLE 1-continued

| | Substrate | | Particle | | | Film Thickness (μm) | | Film Thickness (μm) after 100-kg/cm²-press | | Surface Layer | |
|---|---|---|---|---|---|---|---|---|---|---|---|
| | Thickness (μm) | Coated Surface | Kind | Ratio (vol %) | Collapsibility of Particle | Separator | Surface Layer | Separator | Surface Layer | Compression Rate (%) | Peeling Resistance |
| Comparative Example 1-6 | | Single Surface | Alumina | 100 | — | 21 | 9 | 19 | 7 | 22 | A |
| Comparative Example 1-7 | | Single Surface | Alumina/Boehmite (Particle Size 6 μm) | 80/20 | Absent | 17 | 5 | 16 | 4 | 20 | A |
| Comparative Example 1-8 | | Double Surfaces | Alumina/Boehmite (Particle Size 6 μm) | 80/20 | Absent | 22 | 5* | 19 | 3.5* | 30 | A |
| Comparative Example 1-9 | | Single Surface | Alumina/Boehmite (Particle Size 9.5 μm) | 50/50 | Absent | 20 | 8 | 18 | 6 | 25 | A |
| Comparative Example 1-10 | | Double Surfaces | Alumina/Boehmite (Particle Size 9.5 μm) | 50/50 | Absent | 28 | 8* | 23 | 5.5* | 31 | A |

*(Per Single Surface)

As shown in Table 1, in working example 1-1 to working example 1-12, the compression rate of the surface layer could be made high because they had the first regions configured by the collapsible particles. Furthermore, in working example 1-1 to working example 1-12, the peeling resistance could be ensured because they included the second region configured by the second particles different from the collapsible particles and the resin material as well as the first regions. On the other hand, in comparative example 1-1 to comparative example 1-4, the peeling resistance was poor because the surface layer did not include the second region although containing the collapsible particles. In comparative example 1-6 to comparative example 1-10, the compression rate of the surface layer was low because the surface layer did not contain the collapsible particles.

Working Example 2-1 to Working Example 2-12

Separators of working example 2-1 to working example 2-12 were fabricated similarly to working example 1-1 to working example 1-12.

Comparative Example 2-1 to Comparative Example 2-7

Separators of comparative example 2-1 to comparative example 2-7 were fabricated similarly to comparative example 1-1 to comparative example 1-7.

Comparative Example 2-8

A separator of comparative example 2-8 was fabricated similarly to comparative example 2-7.

Comparative Example 2-9 and Comparative Example 2-10>

Separators were fabricated similarly to comparative example 2-7 except for that the resin solution was applied on both surfaces of the substrate. The application amount of the resin solution per single surface was the same as that of comparative example 2-7.

(Evaluation)

About working example 2-1 to working example 2-12 and comparative example 2-1 to comparative example 2-10, "confirmation of collapsibility of particles" similar to the above, "measurement of film thickness of surface layer before press and surface layer after press" similar to the above, and "measurement of air permeability before press and after press" were performed.

(Measurement of Air Permeability Before Press and after Press)

First, the air permeability of the separator before press and after press was obtained. The air permeability was obtained as follows. The time (seconds) it took for 100 cc of the air to pass through a microporous membrane with an area of 645 mm² (circle with a diameter of 28.6 mm) was measured by using a Gurley air permeability meter compliant with JIS P8117, and the measured time was employed as the air permeability.

Next, one piece of the separator was sandwiched between heavy paper sheets and the separator was pressed by using a hand press machine at a pressure of 100 kg/cm² (examples other than comparative example 2-7 and comparative example 2-9) or 200 kg/cm² (comparative example 2-7 and comparative example 2-9). Next, the air permeability of the separator after the press was obtained similarly to the above. In comparative example 2-7 and comparative example 2-9, the compression pressure was raised in order to evaluate the air permeability of the separator when a crushing amount equivalent to the crushing amount of the case of using the collapsible particles was obtained in the case in which particles without collapsibility were used. Specifically, such compression pressure was set that, in comparative example 2-7, the compression rate of the surface layer became equivalent to that of working example 2-1, and in comparative example 2-9, the compression rate of the surface layer became equivalent to that of working example 2-2.

The evaluation results of working example 2-1 to working example 2-12 and comparative example 2-1 to comparative example 2-10 are shown in Table 2.

TABLE 2

| | Substrate | | Particle | | | Film Thickness (μm) | |
|---|---|---|---|---|---|---|---|
| | Thickness (μm) | Coated Surface | Kind | Ratio (vol %) | Collapsibility of Particle | Separator | Surface Layer |
| Working Example 2-1 | 12 | Single Surface | Alumina/H122 | 80/20 | Present | 22 | 10 |
| Working Example 2-2 | | Single Surface | Alumina/H52 | 80/20 | Present | 20 | 8 |
| Working Example 2-3 | | Single Surface | Alumina/H33 | 80/20 | Present | 17 | 5 |
| Working Example 2-4 | | Double Surfaces | Alumina/H33 | 80/20 | Present | 22 | 5* |
| Working Example 2-5 | | Single Surface | Alumina/H33 | 70/30 | Present | 17 | 5 |
| Working Example 2-6 | | Single Surface | Alumina/H33 | 60/40 | Present | 17 | 5 |
| Working Example 2-7 | | Single Surface | Alumina/H33 | 50/50 | Present | 17 | 5 |
| Working Example 2-8 | | Single Surface | Alumina/H33 | 40/60 | Present | 17 | 5 |
| Working Example 2-9 | | Single Surface | Alumina/H33 | 30/70 | Present | 17 | 5 |
| Working Example 2-10 | | Single Surface | Alumina/H33 | 20/80 | Present | 17 | 5 |
| Working Example 2-11 | | Single Surface | Alumina/H33 | 10/90 | Present | 17 | 5 |
| Working Example 2-12 | | Single Surface | Alumina/H33 | 5/95 | Present | 17 | 5 |
| Comparative Example 2-1 | 12 | — | — | — | — | 12 | — |
| Comparative Example 2-2 | | Single Surface | H122 | 100 | Present | 26 | 14 |
| Comparative Example 2-3 | | Single Surface | H52 | 100 | Present | 21 | 9 |
| Comparative Example 2-4 | | Single Surface | H33 | 100 | Present | 17 | 5 |
| Comparative Example 2-5 | | Double Surfaces | H33 | 100 | Present | 22 | 5* |
| Comparative Example 2-6 | | Single Surface | Alumina | 100 | — | 21 | 9 |
| Comparative Example 2-7 | | Single Surface | Alumina/Boehmite (Particle Size 6 μm) | 80/20 | Absent | 17 | 5 |
| Comparative Example 2-8 | | Single Surface | Alumina/Boehmite (Particle Size 6 μm) | 80/20 | Absent | 17 | 5 |
| Comparative Example 2-9 | | Double Surfaces | Alumina/Boehmite (Particle Size 6 μm) | 80/20 | Absent | 22 | 5* |
| Comparative Example 2-10 | | Double Surfaces | Alumina/Boehmite (Particle Size 6 μm) | 80/20 | Absent | 22 | 5* |

| | Compression Pressure (kg/cm$^2$) | Film Thickness (μm) after 100-kg/cm$^2$-press | | Air Permeability | |
|---|---|---|---|---|---|
| | | Separator | Surface Layer | Before Press (sec/100 ml) | After Press (sec/100 ml) |
| Working Example 2-1 | 100 | 15 | 3 | 487.9 | 520.0 |
| Working Example 2-2 | 100 | 15 | 3 | 486.3 | 523.0 |
| Working Example 2-3 | 100 | 15 | 3 | 471.4 | 515.3 |
| Working Example 2-4 | 100 | 18 | 3* | 487.6 | 519.3 |
| Working Example 2-5 | 100 | 15 | 3 | 480.2 | 525.8 |
| Working Example 2-6 | 100 | 15 | 3 | 463.6 | 500.3 |
| Working Example 2-7 | 100 | 15 | 3 | 485.2 | 515.5 |
| Working Example 2-8 | 100 | 15 | 3 | 480.0 | 518.0 |
| Working Example 2-9 | 100 | 15 | 3 | 478.2 | 520.1 |

TABLE 2-continued

| | | | | | |
|---|---|---|---|---|---|
| Working Example 2-10 | 100 | 15 | 3 | 468.4 | 498.9 |
| Working Example 2-11 | 100 | 15 | 3 | 475.9 | 510.3 |
| Working Example 2-12 | 100 | 15 | 3 | 470.2 | 505.3 |
| Comparative Example 2-1 | 100 | 12 | — | 454.1 | 510.5 |
| Comparative Example 2-2 | 100 | 15 | 3 | 477.9 | 520.3 |
| Comparative Example 2-3 | 100 | 16 | 4 | 476.2 | 519.1 |
| Comparative Example 2-4 | 100 | 15 | 3 | 464.3 | 525.3 |
| Comparative Example 2-5 | 100 | 18 | 3* | 473.6 | 538.4 |
| Comparative Example 2-6 | 100 | 19 | 7 | 550.8 | 648.3 |
| Comparative Example 2-7 | 100 | 16 | 4 | 464.7 | 508.3 |
| Comparative Example 2-8 | 200 | 15 | 3 | 464.7 | 678.0 |
| Comparative Example 2-9 | 100 | 19 | 3.5* | 479.0 | 528.3 |
| Comparative Example 2-10 | 200 | 18 | 3* | 479.0 | 688.2 |

*(Per Single Surface)

As shown in Table 2, in working example 2-1 to working example 2-12, because the particles configuring the first regions had the collapsibility, the crushing amount of the surface layer was large and the increase in the air permeability after the press could be suppressed to a larger extent. On the other hand, in comparative example 2-1, with only the substrate, it was impossible that the separator was crushed to such an extent that the crushing could be detected by the thickness measurement. However, because the substrate surface was compressed, the increase in the air permeability was large after the press. In comparative example 2-7 and comparative example 2-9, in the case in which the collapsibility was absent in the particles, the crushing amount was small. However, the extent of the increase in the air permeability was equivalent to that when the particles configuring the first regions had the collapsibility. In comparative example 2-8 and comparative example 2-10, in the case in which the collapsibility was absent in the particles, when the compression pressure was increased to ensure the crushing amount, the crushing amount was equivalent to that when the particles had the collapsibility but the increase in the air permeability was large.

Working Example 3-1

A separator was fabricated similarly to working example 1-8.

Comparative Example 3-1

A separator was fabricated similarly to comparative example 1-6.

Comparative Example 3-2

A separator was fabricated similarly to comparative example 1-7.

(Evaluation)

About working example 3-1 and comparative example 3-1 and comparative example 3-2, "confirmation of collapsibility of particles" similar to the above, "measurement of surface layer compression rate" similar to the above, "measurement of surface roughness (Ra) before press," "measurement of surface roughness (Ra) after press," and "SEM observation of surface layer before press and after press" were performed.

(Measurement of Surface Roughness (Ra) before Press)

First, the surface roughness (Ra) of the surface layer before press was measured as follows. Concavity and convexity of the surface were measured by using a laser microscope (VK-9500 made by KEYENCE CORPORATION). At this time, the measured range was 210 μm*280 μm, and Ra (arithmetic average roughness) was calculated from the measurement result.

(Measurement of Surface Roughness (Ra) after Press)

Next, one piece of the separator was sandwiched by heavy paper sheets and the separator was pressed at a pressure of 100 kg/cm² by using a hand press machine. Concavity and convexity of the surface were measured by using a laser microscope (VK-9500 made by KEYENCE CORPORATION). At this time, the measured range was 210 μm 280 μm, and Ra (arithmetic average roughness) was calculated from the measurement result.

(SEM Observation of Surface Layer Before Press and after Press)

Figure 17:
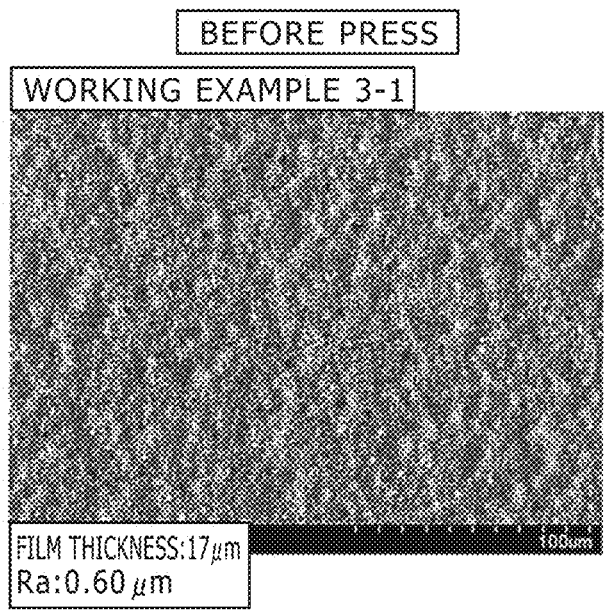
FIG. 17A is a SEM image of the surface layer (before press) of a separator of working example 3-1.
FIG. 17B is a SEM image of the surface layer (after the press) of the separator of working example 3-1.
Figure 17:
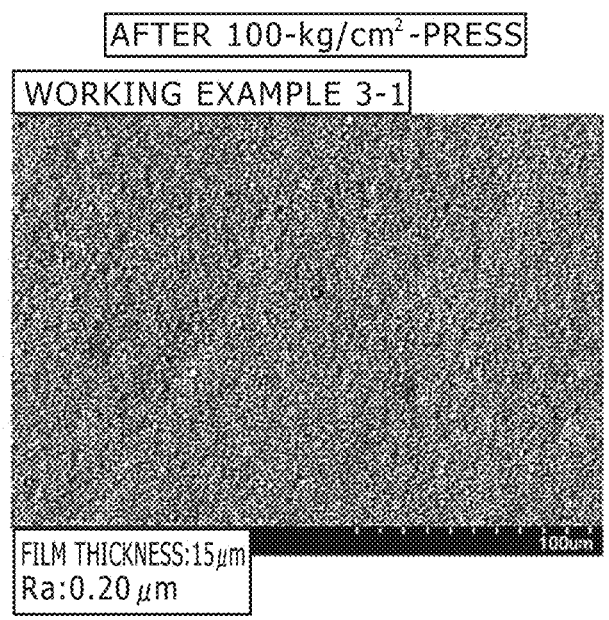
Figure 18:
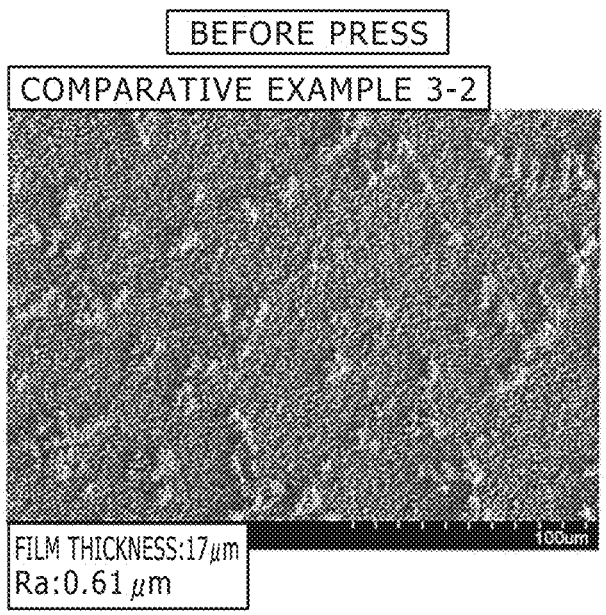
FIG. 18A is the surface layer (before press) of a separator of comparative example 3-2.
FIG. 18B is the surface layer (after the press) of the separator of comparative example 3-2.
Figure 18:
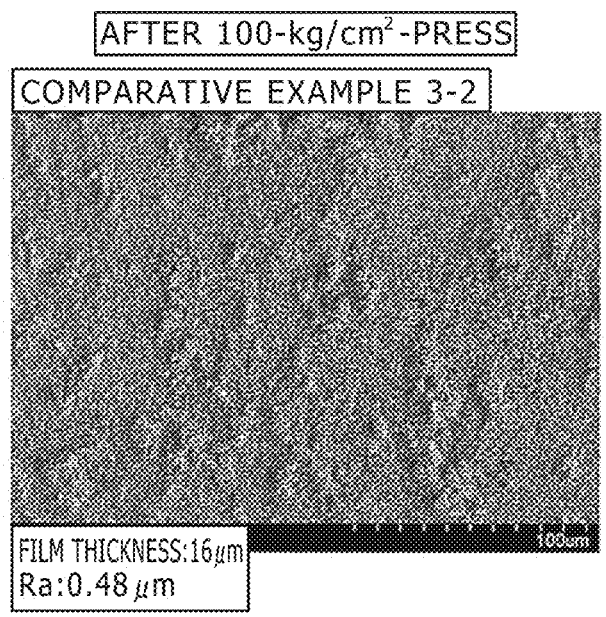

About working example 3-1 and comparative example 3-2, SEM observation of the surface layer before the press and after the press was performed. In FIG. 17A, a SEM image of the surface layer (before the press) of the separator of working example 3-1 is shown. In FIG. 17B, a SEM image of the surface layer (after the press) of the separator of working example 3-1 is shown. In FIG. 18A, the surface layer (before the press) of the separator of comparative example 3-2 is shown. In FIG. 18B, the surface layer (after the press) of the separator of comparative example 3-2 is shown.

The evaluation results of working example 3-1 and comparative example 3-1 and comparative example 3-2 are shown in Table 3.

TABLE 3

| | Substrate | | Particle | | | Film Thickness (μm) | | Film Thickness (μm) after 100-kg/cm²-press | | Surface Layer Compression Rate (%) | Ra Before Press (μm) | Ra After Press (μm) |
|---|---|---|---|---|---|---|---|---|---|---|---|---|
| | Thickness (μm) | Coated Surface | Kind | Ratio (vol %) | Collapsibility of Particle | Separator | Surface Layer | Separator | Surface Layer | | | |
| Working Example 3-1 | 12 | Single Surface | Alumina/ H33 | 80/20 | Present | 17 | 5 | 15 | 3 | 40 | 0.60 | 0.20 |
| Comparative Example 3-1 | 12 | Single Surface | Alumina | 100 | — | 21 | 9 | 19 | 7 | 22.2 | 0.21 | 0.20 |
| Comparative Example 3-2 | | Single Surface | Alumina/ Boehmite | 80/20 | Absent | 17 | 5 | 16 | 4 | 20.0 | 0.61 | 0.48 |

As shown in Table 3, in working example 3-1, because the first particles (collapsible particles H33) configuring the first regions have the collapsibility, the first particles (collapsible particles H33) are crushed until the concave-convex shape before the press becomes flat and smooth. Therefore, the surface roughness of the surface layer after the press was small. In working example 3-1, adverse effects such as potential unevenness can be suppressed by improving the surface roughness after the press to make the distance between the electrodes constant. On the other hand, in comparative example 3-2, because the particles (boehmite particles) did not have the collapsibility, the surface roughness of the surface layer after the press was large. In comparative example 3-1, because the particles contained in the surface layer were a single kind and the surface roughness was small from before the press, there was almost no difference in the surface roughness between before the press and after the press.

Working Example 4-1

When the surface layer was formed, the application amount of the resin solution was so adjusted that the film thickness of the second region would become 1.5 μm. A separator was fabricated similarly to working example 1-3 except for the above point.

Working Example 4-2

When the surface layer was formed, the application amount of the resin solution was so adjusted that the film thickness of the second region would become 1.0 μm. A separator was fabricated similarly to working example 4-1 except for the above point.

(Evaluation)

About working example 4-1 and working example 4-2, "measurement of film thickness of second region" and "evaluation of oxidation resistance" were performed.

(Measurement of Film Thickness of Second Region)

The surface layer of the separator was peeled by tape and the level difference between the coated part of the made surface layer and the uncoated part was measured by using a laser microscope (VK-9500 made by KEYENCE CORPORATION). The level difference between the substrate and the second region was deemed as the film thickness of the second region.

(Evaluation of Oxidation Resistance)

The oxidation resistance was evaluated by performing electron microscope observation of the surface layer of the separator by using a scanning electron microscope S4800 made by Hitachi High-Technologies Corporation. Specifically, about the surface layer, SEM observation of a predetermined range (250 μm*100 μm) was performed at 10 places randomly and the oxidation resistance was evaluated based on the following criteria.

in the case in which part where the substrate surface was exposed could not be found

A in the case in which part where the substrate surface was exposed could be found at one or more places

B in the case in which part where the substrate surface was exposed could be found at all the places

C

The evaluation results about working example 4-1 and working example 4-2 are shown in Table 4. In working example 4-1 and working example 4-2, there was no separator falling under the evaluation of the case in which part where the substrate surface was exposed could be found at all the places (C).

TABLE 4

| | Substrate Thickness (μm) | First Region Constituent Particle | Second Region Constituent Particle | Separator Film Thickness (μm) | Second Region Film Thickness (μm) | Evaluation of Oxidation Resistance |
|---|---|---|---|---|---|---|
| Working Example 4-1 | 12 | H33 | Alumina (Particle Size 0.5 μm) | 17 | 1.5 | A |
| Working Example 4-2 | | H33 | Alumina (Particle Size 0.5 μm) | 17 | 1.0 | B |

As shown in Table 4, according to working example 4-1 and working example 4-2, it could be confirmed that the exposure of the substrate was absent and effects more excellent in the heat resistance and the oxidation resistance were achieved if the film thickness of the second region was 1.5 μm or larger.

Working Example 5-1

When the surface layer was formed, the application amount of the resin solution was so adjusted that the film thickness of the second region would become 1.5 μm. A separator was fabricated similarly to working example 1-4 except for the above point.

Comparative Example 5-1

A substrate (polyethylene (PE)) porous membrane with a thickness of 12 μm) on which the surface layer was not formed was employed as a separator of comparative example 5-1.

Comparative Example 5-2

The resin solution was applied on both surfaces of the substrate. When the surface layers were formed, the application amount of the resin solution was so adjusted that the film thickness of the surface layers would become 2.0 μm. A separator was fabricated similarly to comparative example 1-6 except for the above points.

Comparative Example 5-3

A separator was fabricated similarly to comparative example 1-5.
(Evaluation)
About working example 5-1 and comparative example 5-1 to comparative example 5-3, "measurement of film thickness of second region" similar to the above and "evaluation of heat resistance (measurement of shrinkage rate after high temperature preservation)" were performed.
(Heat Resistance: Measurement of Shrinkage Rate after High Temperature Preservation)
The separators of the respective working examples and comparative examples were cut into 60 mm along the MD (Machine Direction) direction and into 60 mm along the TD (Transverse Direction) direction and were allowed to stand in an oven at 150 deg for one hour. At this time, the separator was so allowed to stand as to be sandwiched by two pieces of paper so that the separator may be prevent from being directly exposed to hot air.

Thereafter, the separators were taken out from the oven to be cooled and the respective lengths (mm) along the MD direction and the TD direction were measured. The thermal shrinkage rates in the MD direction and the TD direction were calculated from the following respective equations.

MD thermal shrinkage rate (%)=(60−Length of microporous membrane along MD direction after heating)/60*100

TD thermal shrinkage rate (%)=(60−Length of microporous membrane along TD direction after heating)/60*100

In Table 5, the evaluation results about working example 5-1 and comparative example 5-1 to comparative example 5-3 are shown.

As shown in Table 5, the thermal shrinkage of the substrate could be suppressed in the separator including the surface layer having the first regions and the second region like working example 5-1. On the other hand, the thermal shrinkage was large in the case in which only the substrate was employed without forming the surface layer like comparative example 5-1. When the particles contained in the surface layer were a single kind of collapsible particles like comparative example 5-3, the thermal shrinkage was large because the substrate could not be uniformly covered. When the particles contained in the surface layer were a single kind of alumina particles that did not have the collapsibility like comparative example 5-2, the thermal shrinkage was small because the substrate could be uniformly covered. However, in the separator of comparative example 5-2, the crushing amount of the surface layer after the press was small because it did not include the first regions.

Working Example 6-1

Fabrication of Separator

A separator was fabricated similarly to working example 1-4 except for that the application amount of the resin solution was changed.

Next, a coin battery and a cylindrical battery using the fabricated separator were fabricated in the following manner.
(Fabrication of Coin Battery)
(Fabrication of Cathode)

91 mass % of lithium cobalt oxide ($LiCoO_2$) as the cathode active material, 6 mass % of carbon black as a conducting agent, and 3 mass % of polyvinylidene fluoride (PVdF) as a binding agent were mixed to prepare a cathode mix and this cathode mix was dispersed in N-methyl-2-pyrrolidone (NMP) as a dispersion medium to be turned to cathode mix slurry. This cathode mix slurry was applied on both surfaces of a cathode current collector formed of a strip-shaped aluminum foil with a thickness of 15 μm in such a manner that part of the cathode current collector was exposed. Thereafter, a cathode active material layer was formed by evaporating and drying the dispersion medium of the applied cathode mix slurry and performing compression molding by roll press. This was stamped out into a circular shape with a diameter of 16 mm to form the cathode.
(Fabrication of Anode)

At first, a silicon-based material $SiO_x$ (core part) was obtained by a gas atomization method and then a silicon-based material $SiO_y$ (covering part) with lower crystallinity

TABLE 5

| | Substrate | | Particle | | Separator Film | Second Region Film | Shrinkage Rate (%) | |
|---|---|---|---|---|---|---|---|---|
| | Thickness (μm) | Coated Surface | Kind | Ratio (Vol %) | Thickness (μm) | Thickness (μm) | MD Direction | TD Direction |
| Working Example 5-1 | 12 | Double Surfaces | Alumina/H33 | 80/20 | 22 | 2.0 | 26 | 23 |
| Comparative Example 5-1 | 12 | — | — | — | 12 | — | 75 | 70 |
| Comparative Example 5-2 | 12 | Double Surfaces | Alumina | 100 | 16 | 2.0 | 34 | 30 |
| Comparative Example 5-3 | 12 | Double Surfaces | H33 | 100 | 22 | — | 65 | 41 | than the core part was deposited on its surface by a powder evaporation method to obtain the anode active material. In the core part, half width=0.6 deg, crystallite size=90 nm, and average particle size=4 μm were set. In the covering part, average thickness=500 nm and average coverage=70% were set.

In the case of forming the silicon-based material ($SiO_x$) of the core part, the composition (oxidation state) was controlled by adjusting the oxygen introduction amount at the time of melting and solidification of the raw material (silicon). In the case of forming the silicon-based material ($SiO_y$) of the covering part, the composition was controlled by adjusting the introduction amount of oxygen or hydrogen at the time of the deposition of the raw material (silicon). In the powder evaporation method, a deflected electron beam evaporation source was used. In addition, deposition rate=2 nm/seconds was set and a vacuum state with pressure=$1*10^{-3}$ Pa was made by a turbo molecular pump.

80 mass % of the silicon-based material as the anode active material and 20 mass % (dry mass ratio) of a polyamic acid solution that is a precursor of polyimide as a binding agent were mixed to prepare an anode mix and this anode mix was dispersed in N-methyl-2-pyrrolidone (NMP) as a dispersion medium to be turned to anode mix slurry. As the solvent of the polyamic acid solution, NMP and N,N-dimethylacetamide (DMAC) were used. This anode mix slurry was applied on both surfaces of an anode current collector formed of a strip-shaped copper foil with a thickness of 15 μm in such a manner that part of the anode current collector was exposed. Thereafter, the dispersion medium of the applied anode mix slurry was evaporated and dried and compression molding was performed by roll press. Then, baking was performed for one hour in a vacuum atmosphere at 400 deg. Thereby, the polyimide as the binding agent was generated to form an anode active material layer. At last, this was stamped out into a circular shape with a diameter of 17 mm to form the cathode.

(Preparation of Non-Aqueous Electrolyte Solution)

A non-aqueous electrolyte solution was prepared by dissolving lithium hexafluorophosphate ($LiPF_6$) as an electrolyte salt at a concentration of 1 mol/dm$^3$ in a non-aqueous solvent obtained by mixing ethylene carbonate (EC), vinylene carbonate (VC), and diethyl carbonate (DEC) at a mass ratio of 30:10:60.

(Assembly of Coin Battery)

The fabricated cathode and anode were stacked with the intermediary of the separator. The stacked body was housed inside an exterior cup and an exterior can and caulking was performed with the intermediary of a gasket. Thereby, a coin non-aqueous electrolyte secondary battery with a diameter of 20 mm and a height of 1.6 mm was fabricated.

(Fabrication of Cylindrical Battery)

(Fabrication of Cathode)

The same cathode active material layer as the above was formed on the same cathode current collector as the above similarly to the fabrication step of the cathode of the above-described coin battery. At last, a cathode terminal was attached to the exposed part of the cathode current collector to form the cathode.

(Fabrication of Anode)

The same anode active material layer as the above was formed on the same anode current collector as the above similarly to the fabrication step of the anode of the above-described coin battery. At last, an anode terminal was attached to the exposed part of the anode current collector to obtain the anode.

(Preparation of Non-Aqueous Electrolyte Solution)

The same non-aqueous electrolyte solution as the above was prepared similarly to the adjustment step of the non-aqueous electrolyte solution of the above-described coin battery.

(Assembly of Cylindrical Battery)

The cathode, the anode, and the separator were stacked in order of cathode, separator, anode, and separator and were wound many times in the longitudinal direction. Then, the winding-end part was fixed by adhesive tape to thereby form a wound electrode body. At this time, the surface layer having a concave-convex shape in the separator was disposed opposed to the anode. Next, the cathode terminal was bonded to a safety valve bonded to a battery lid and an anode lead was connected to an anode can. The wound electrode body was sandwiched by a pair of insulating plates and was housed inside a battery can. Then, a center pin was inserted into the center of the wound electrode body.

Subsequently, the non-aqueous electrolyte solution was poured into the inside of the cylindrical battery can from above the insulating plate. At last, the battery can was hermetically sealed by caulking a safety valve mechanism composed of the safety valve, a disk holder, and a blocking disk, a PTC element, and the battery lid to the open part of the battery can with the intermediary of an insulating sealing gasket. Thereby, the cylindrical battery shown in FIG. 4 whose battery shape had a diameter of 18 mm and a height of 65 mm (ICR18650 size) and whose battery capacity was 3500 mAh was fabricated.

Comparative Example 6-1

Fabrication of Separator

A separator was fabricated similarly to comparative example 1-6 except for that the application amount of the resin solution was changed.

(Fabrication of Coin Battery and Cylindrical Battery)

A coin battery and a cylindrical battery were fabricated by using the above-described separator similarly to working example 6-1.

(Evaluation)

About working example 6-1 and comparative example 6-1, a charge/discharge test was made to perform "measurement of film thickness of second region," "measurement of anode expansion rate," and "evaluation of foil break."

(Measurement of Anode Expansion Rate)

With the respective coin batteries of the working example and comparative example, a constant-current charge was performed in an atmosphere at 23 deg with a charge current of 0.5 C until the battery voltage became 4.2 V. Then, a constant-voltage charge was performed at a battery voltage of 4.2 V and the charge was ended at the timing when the charge current became 50 mA. A charge/discharge cycle under this charge/discharge condition was performed by 10 cycles. After the charge/discharge cycles, the coin batteries were broken down and "thickness of anode mix layer" and "thickness of separator" were measured. The thickness of the anode mix layer is a thickness resulting from subtraction of the thickness of 15 μm of the copper foil.

(Expansion Rate Calculation)

Anode expansion rate (%)={(Anode mix thickness after charge/discharge cycles)/(Anode mix thickness before charge/discharge cycles)}*100 (%)

(Evaluation of Foil Break)

With the respective cylindrical batteries of the working example and comparative example, a constant-current charge was performed in an atmosphere at 23 deg with a charge current of 0.5 C until the battery voltage became 4.2 V. Then, a constant-voltage charge was performed at a battery voltage of 4.2 V and the charge was ended at the timing when the charge current became 50 mA. Thereafter, the cylindrical batteries were broken down and the presence or absence of a break of the electrode was visually checked to evaluate the foil break suppression effect based on the following criteria.

| foil break did not occur | A |
| foil break occurred | B |

The evaluation results of working example 6-1 and comparative example 6-1 are shown in Table 6.

TABLE 6

| | | Second | Before Cycle Test | | | After 10-Cycles Test | | | |
|---|---|---|---|---|---|---|---|---|---|
| | First Region Constituent Particle | Region Film Thickness (μm) | Separator Film Thickness (μm) | Anode Film Thickness (μm) | | Separator Film Thickness (μm) | Anode Film Thickness (μm) | Anode Expansion Rate (%) | Evaluation of Foil Break |
| | Substrate Thickness (μm) | | | | | | | | |
| Working Example 6-1 | 12 | H33 | 2.0 | 22 | 31 | 18 | 100 | 323 | A |
| Comparative Example 6-1 | 12 | — | 2.0 | 22 | 31 | 21 | 91 | 294 | B |

As shown in Table 6, the following was found out according to comparison of the change in the separator film thickness between before the cycle test and after the cycle test and the anode expansion rate between working example 6-1 and comparative example 6-1. Specifically, due to the collapse and crushing of the first particles forming the first regions in the surface layer having the first regions and the second region, a crushing amount of separator and an anode expansion rate that were sufficient could be ensured.

7. Other Embodiments

The present technique is not limited to the above-described embodiments of the present technique and various modifications and applications are possible in such a range as not to depart from the gist of the present technique.

For example, numerical values, structures, shapes, materials, raw materials, manufacturing processes, and so forth cited in the above-described embodiments and working examples are just examples, and numerical values, structures, shapes, materials, raw materials, manufacturing processes, and so forth different from them may be used according to need.

Furthermore, configurations, methods, steps, shapes, materials, numerical values, and so forth of the above-described embodiments and working examples can be combined with each other unless the combination departs from the gist of the present technique.

In the secondary battery of the present technique, the electrochemical equivalent of the anode material capable of storing and releasing lithium may be higher than the electrochemical equivalent of the cathode so that the lithium metal may be prevented from precipitating on the anode in the middle of a charge.

Furthermore, in the secondary battery of the present technique, the open circuit voltage in the fully-charged state per one pair of cathode and anode (i.e. battery voltage) may be at most 4.20 V. However, the secondary battery may be so designed that it is higher than 4.20 V and preferably in a range of 4.25 V to 4.50 V inclusive. By setting the battery voltage higher than 4.20 V, even with the same cathode active material, the release amount of lithium per unit mass becomes larger than that in a battery whose open circuit voltage when it is fully charged is 4.20 V. Thus, the amounts of cathode active material and anode active material are adjusted according to it. This allows achievement of higher energy density.

It is also possible for the present technique to employ the following configurations.

[1]
A separator including:
a porous substrate layer; and
a porous surface layer that is provided on at least one major surface of the substrate layer and contains a first particle, a second particle, and a resin material,
wherein
the surface layer includes
a first region configured by at least the first particle, and
a second region configured by the second particle and the resin material.

[2]
The separator according to [1], wherein
the first particle contains microparticles whose average particle size of a primary particle is at least 1 nm and at most 500 nm, and
the second particle contains a particle whose average particle size of a primary particle is at least 0.01 μm and at most 3.0 μm.

[3]
The separator according to any of [2], wherein
the first particle is a secondary particle arising from aggregation of the microparticles, and
average particle size of the secondary particle is at least 3.0 μm.

[4]
The separator according to any of [1] to [3], wherein the first particle collapses to be crushed into an ellipsoidal shape.

[5]
The separator according to any of [1] to [4], wherein at least part of a surface of the first particle is covered by the second particle.

[6]
The separator according to any of [1] to [5], wherein
the first particle collapses at time of press at 100 kg/cm$^2$, and
a compression rate of the surface layer after the press at 100 kg/cm$^2$ is at least 40%.

[7]
The separator according to any of [1] to [6], wherein a volume ratio of the second particle is at least 10% with respect to a total volume of the first particle and the second particle.

[8]
The separator according to any of [1] to [7], wherein thickness of the second region is at least 1.5 μm.

[9]
The separator according to any of [1] to [8], wherein the first particle functions as a spacer and particle height of the first particle is substantially equal to thickness of the surface layer.

[10]

The separator according to any of [1] to [9], wherein the second region has a porous structure formed by the second particle and the resin material.

[11]

The separator according to any of [1] to [10], wherein the substrate layer is a polyolefin microporous membrane.

[12]

A battery including:
a cathode;
an anode;
an electrolyte; and
a separator, wherein
the separator includes
a porous substrate layer, and
a porous surface layer that is provided on at least one major surface of the substrate layer and contains a first particle, a second particle, and a resin material, and
the surface layer includes
a first region configured by at least the first particle, and
a second region configured by the second particle and the resin material.

[13]

The battery according to [12], wherein
the anode contains, as an anode active material, an alloy-based anode material containing at least one kind of a metallic element and a metalloid element capable of forming an alloy with lithium as a constituent element.

[14]

The battery according to [13], wherein
the alloy-based anode material contains tin as the constituent element.

[15]

A battery pack including:
the battery according to [12];
a control section that controls the battery; and
an exterior package that includes the battery.

[16]

Electronic apparatus including
the battery according to [12], wherein
the electronic apparatus receives supply of power from the battery.

[17]

An electric vehicle including:
the battery according to [12];
a conversion unit that receives supply of power from the battery and converts the power to driving force of the vehicle; and
a control unit that executes information processing relating to vehicle control based on information relating to the battery.

[18]

An electric storage device including
the battery according to [12], wherein
the electric storage device supplies power to electronic apparatus connected to the battery.

[19]

The electric storage device according to [18], further including
a power information control unit that transmits and receives a signal to and from another piece of apparatus via a network, wherein
the electric storage device carries out charge/discharge control of the battery based on information received by the power information control unit.

[20]

A power system in which supply of power is received from the battery according to [12] or power is supplied to the battery from electric generating equipment or a power network.

REFERENCE SIGNS LIST

1 ... Separator, 2 ... Substrate, 3 ... Surface layer, 4a ... First particle, 4b ... Second particle, 11 ... Battery can, 12a ... Insulating plate, 13 ... Battery lid, 14 ... Safety valve, 14a ... Protrusion, 15 ... Disk holder, 16 ... Blocking disk, 16a ... Hole, 17 ... Heat-sensitive resistor element, 18 ... Gasket, 19 ... Sub-disk, 20 ... Wound electrode body, 21 ... Cathode, 21A ... Cathode current collector, 21B ... Cathode active material layer, 22 ... Anode, 22A ... Anode current collector, 22B ... Anode active material layer, 23 ... Separator, 24 ... Center pin, 25 ... Cathode lead, 26 ... Anode lead, 30 ... Mass ratio, 31 ... Exterior can, 32 ... Battery lid, 33 ... Electrode pin, 34 ... Insulator, 35 ... Penetration hole, 36 ... Internal pressure release mechanism, 36a ... Opening groove, 36b ... Opening groove, 37 ... Electrolyte solution injection port, 38 ... Sealing member, 40 ... Wound electrode body, 41 ... Cathode terminal, 50 ... Wound electrode body, 51 ... Cathode lead, 52 ... Anode lead, 53 ... Cathode, 53A ... Cathode current collector, 53B ... Cathode active material layer, 54 ... Anode, 54A ... Anode current collector, 54B ... Anode active material layer, 56 ... Gel electrolyte, 57 ... Protective tape, 58 ... Separator, 60 ... Exterior member, 61 ... Adhesion film, 70 ... Stacked electrode body, 71 ... Cathode lead, 72 ... Anode lead, 73 ... Cathode, 74 ... Anode, 75 ... Separator, 76 ... Fixing member, 301 ... Assembled battery, 301a ... Secondary battery, 302a ... Charge control switch, 302b ... Diode, 303a ... Discharge control switch, 303b ... Diode, 304 ... Switch section, 307 ... Current detecting resistor, 308 ... Temperature detecting element, 310 ... Control section, 311 ... voltage detector, 313 ... Current measurer, 314 ... Switch controller, 317 ... Memory, 318 ... Temperature detector, 321 ... Cathode terminal, 322 ... Anode terminal, 400 ... Electric storage system, 401 ... House, 402 ... Centralized power system, 402a ... Thermal power generation, 402b ... Nuclear power generation, 402c ... Hydraulic power generation, 403 ... Electric storage device, 404 ... Electric generating equipment, 405 ... Power consuming equipment, 405a ... Refrigerator, 405b ... Air conditioner, 405c ... Television receiver, 405d ... Bath, 406 ... Electric vehicle, 406a ... Electric car, 406b ... Hybrid car, 406c ... Electric motorcycle, 407 ... Smart meter, 408 ... Power hub, 409 ... Power network, 410 ... Control unit, 411 ... Sensor, 412 ... Information network, 413 ... Server, 500 ... Hybrid vehicle, 501 ... Engine, 502 ... Electric generator, 503 ... Power-driving force conversion unit, 504a ... Drive wheel, 504b ... Drive wheel, 505a ... Wheel, 505b ... Wheel, 508 ... Battery, 509 ... Vehicle control unit, 510 ... Sensor, 511 ... Charge port It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A separator comprising:
a porous substrate layer; and
a porous surface layer that is provided on at least one major surface of the substrate layer and contains first particles, second particles, and a resin material, the first particles having an average particle size that is less than an average particle size of the second particles,
wherein the surface layer has a concave and convex surface profile including
a first region having a convex surface profile portion that includes at least the first particles, and a second region having a concave surface profile portion and includes the second particles and the resin material.

2. The separator according to claim 1, wherein
the first particle contains microparticles whose average particle size of a primary particle is at least 1 nm and at most 500 nm, and
the second particle contains a particle whose average particle size of a primary particle is at least 0.01 μm and at most 3.0 μm.

3. The separator according to claim 2, wherein
the first particle is a secondary particle arising from aggregation of the microparticles, and
average particle size of the secondary particle is at least 3.0 μm.

4. The separator according to claim 3, wherein
the first particle collapses to be crushed into an ellipsoidal shape.

5. The separator according to claim 3, wherein
at least part of a surface of the first particle is covered by the second particle.

6. The separator according to claim 3, wherein
the first particle collapses at time of press at 100 kg/cm$^2$, and
a compression rate of the surface layer after the press at 100 kg/cm$^2$ is at least 40%.

7. The separator according to claim 3, wherein
a volume ratio of the second particle is at least 10% with respect to a total volume of the first particle and the second particle.

8. The separator according to claim 3, wherein
thickness of the second region is at least 1.5 μm.

9. The separator according to claim 3, wherein
the first particle functions as a spacer and particle height of the first particle is substantially equal to thickness of the surface layer.

10. The separator according to claim 3, wherein
the second region has a porous structure formed by the second particle and the resin material.

11. The separator according to claim 3, wherein
the substrate layer is a polyolefin microporous membrane.

12. A battery comprising:
a cathode;
an anode;
an electrolyte; and
a separator, wherein
the separator includes
a porous substrate layer, and
a porous surface layer that is provided on at least one major surface of the substrate layer and contains first particles, second particles, and a resin material, the first particles having an average particle size that is less than an average particle size of the second particles, and
wherein the surface layer has a concave and convex surface profile including
a first region having a convex surface profile portion that includes at least the first particle, and
a second region having a concave surface profile portion and includes the second particle and the resin material.

13. The battery according to claim 12, wherein
the anode contains, as an anode active material, an alloy-based anode material containing at least one kind of a metallic element and a metalloid element capable of forming an alloy with lithium as a constituent element.

14. The battery according to claim 13, wherein
the alloy-based anode material contains tin as the constituent element.

15. A battery pack comprising:
the battery according to claim 12;
a control section that controls the battery; and
an exterior package that includes the battery.

16. Electronic apparatus comprising
the battery according to claim 12, wherein
the electronic apparatus receives supply of power from the battery.

17. An electric vehicle comprising:
the battery according to claim 12;
a conversion unit that receives supply of power from the battery and converts the power to driving force of the vehicle; and
a control unit that executes information processing relating to vehicle control based on information relating to the battery.

18. An electric storage device comprising
the battery according to claim 12, wherein
the electric storage device supplies power to electronic apparatus connected to the battery.

19. The electric storage device according to claim 18, further comprising
a power information control unit that transmits and receives a signal to and from another piece of apparatus via a network, wherein
the electric storage device carries out charge/discharge control of the battery based on information received by the power information control unit.

20. A power system in which supply of power is received from the battery according to claim 12 or power is supplied to the battery from electric generating equipment or a power network.

* * * * *